(12) United States Patent
Diamant et al.

(10) Patent No.: US 11,263,517 B1
(45) Date of Patent: Mar. 1, 2022

(54) FLEXIBLE WEIGHT EXPANSION

(71) Applicant: Amazon Technologies, Inc., Seattle, WA (US)

(72) Inventors: Ron Diamant, Albany, CA (US); Randy Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1039 days.

(21) Appl. No.: 15/908,080

(22) Filed: Feb. 28, 2018

(51) Int. Cl.
*G06N 3/04* (2006.01)
*G06N 3/063* (2006.01)
*G06N 3/02* (2006.01)
*G06N 3/06* (2006.01)
*G06N 20/00* (2019.01)

(52) U.S. Cl.
CPC ............. *G06N 3/0481* (2013.01); *G06N 3/04* (2013.01); *G06N 3/02* (2013.01); *G06N 3/06* (2013.01); *G06N 3/063* (2013.01); *G06N 20/00* (2019.01)

(58) Field of Classification Search
CPC .......... G06N 3/02; G06N 3/04; G06N 3/0454; G06N 3/0472; G06N 3/0481; G06N 3/049; G06N 3/06; G06N 3/063; G06N 20/00; G06N 20/10; G06N 20/20
See application file for complete search history.

(56) References Cited

U.S. PATENT DOCUMENTS

| | | | | |
|---|---|---|---|---|
| 2016/0026912 | A1* | 1/2016 | Falcon | G06N 3/0454 706/25 |
| 2019/0087713 | A1* | 3/2019 | Lamb | G06N 3/0454 |
| 2019/0147324 | A1* | 5/2019 | Martin | G06N 3/063 706/15 |
| 2020/0026992 | A1* | 1/2020 | Zhang | G06N 3/049 |

* cited by examiner

*Primary Examiner* — Shane D Woolwine
(74) *Attorney, Agent, or Firm* — Kilpatrick Townsend & Stockton LLP

(57) ABSTRACT

Disclosed herein are techniques for obtain weights for neural network computations. In one embodiment, an integrated circuit may include an arithmetic circuit configured to perform arithmetic operations for a neural network. The integrated circuit may also include a weight processing circuit configured to: acquire data from a memory device; receive configuration information indicating a size of each quantized weight of a set of quantized weights; extract the set of quantized weights from the data based on the size of the each weight indicated by the configuration information; perform de-quantization processing on the set of quantized weights to generate a set of de-quantized weights; and provide the set of de-quantized weights to the arithmetic circuit to enable the arithmetic circuit to perform the arithmetic operations. The memory device may be part of or external to the integrated circuit.

19 Claims, 17 Drawing Sheets

FLEXIBLE WEIGHT EXPANSION

BACKGROUND

Artificial neural networks are computing systems with an architecture based on biological neural networks. Artificial neural networks can be trained, using training data, to learn about how to perform a certain computing task.

A neural network may include a set of processing nodes. Each processing node can scale the input data with weights to generate output data. The weights may be determined based on training and may be associated with the computing task. The final decision can be generated based on a combination of the output data generated by the set of processing nodes. As part of the processing, each processing node can perform a set of arithmetic operations such as floating-point multiplications to scale the input data with the weights, and additions to generate a weighted sum of the input data as the output data. A neural network may be implemented by an integrated circuit with arithmetic circuitries, which may acquire the weights from a memory device to perform the arithmetic operations.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of the present disclosure relate to a computing system for performing neural-network processing of data. More specifically, the computing system may be coupled with (or include) a memory device configured to store a set of compressed weights. The computing system may also include a computing engine configured to perform computations for a neural network layer, and a configurable weight expansion engine coupled with the computing engine. The configurable weight expansion engine can acquire data including a set of compressed weights from the memory device, extract the set of compressed weights from the data, and generate a set of corresponding expanded (or uncompressed) weights from the compressed weights. The configurable weight expansion engine can provide the expanded weights to the computing engine to perform the computations for the neural network layer. By storing and fetching the compressed weights from the memory device, the memory access latency associated with weights fetching can be reduced, which can reduce the impact of memory access latency on the performance of the computing system.

An artificial neural network (herein after "neural network") may include multiple processing nodes. The processing nodes can be divided into layers including, for example, an input layer, a number of intermediate layers (also known as hidden layers), and an output layer. Each processing node of one layer (e.g., an input layer, an intermediate layer, etc.) may receive the same set of input data elements. Each processing node can multiply the set of input data elements with a different set of weights to generate a set of weighted input data elements. The sets of weighted input data elements can be forwarded to the next layer to compute weighted sums of the input data elements. The weighted sums can be processed using an activation function to generate a binary output (e.g., "yes" or "no") based on whether the weighted sum of the output data exceeds a threshold. The binary output can be transmitted to the next neural network layer to generate the final output.

Figure 1A:
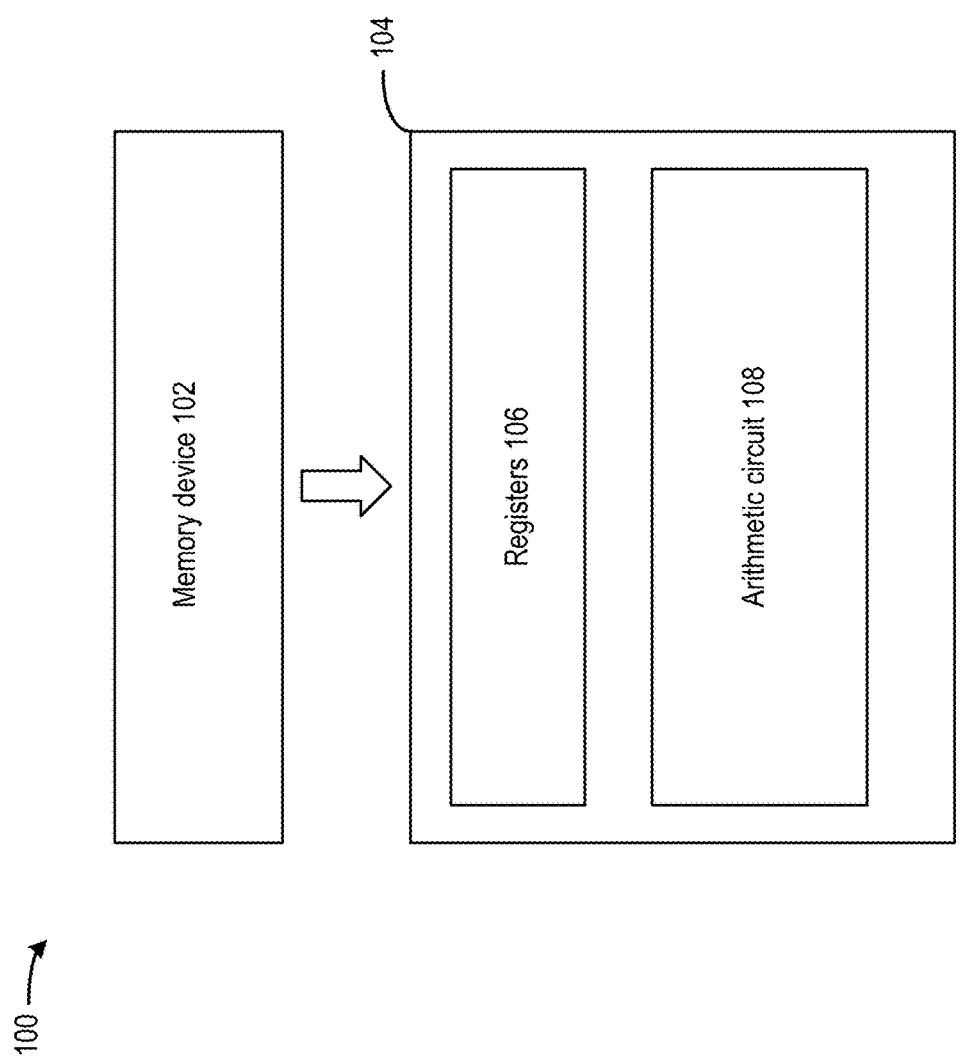
FIGS. 1A-1C illustrate an example neural hardware system and its performance metrics.

As discussed above, a neural network may be implemented by data processing circuitries and a memory device. FIG. 1A illustrates an example of a hardware system 100 for performing neural network computations. Hardware system 100 includes a memory device 102 and a data processing circuit 104. Data processing circuit 104 includes registers 106 and arithmetic circuit 108. Memory device 102 can include any suitable memory, e.g., dynamic random access memory (DRAM), synchronous DRAM (SDRAM), double data rate DRAM (DDR DRAM), storage class memory (SCM), flash memory devices, etc., and can store a set of input data and different sets of weights, with each set of weights corresponding to a processing node. Data processing circuit 104 can pre-fetch one or more sets of weights from memory device 102 and store the one or more sets of weights in registers 106. From registers 106, arithmetic circuit 108 can acquire the one or more sets of weights, and multiply the weights with the set of input data acquired from memory device 102 to generate the weighted sums.

To increase the computation workload at arithmetic circuit 108, data processing circuit 104 can be configured to pre-fetch a larger number of sets of weights from memory device 102, to enable arithmetic circuit 108 to perform the computations for a larger number of processing nodes. Provided that arithmetic circuit 108 has sufficient capacity to handle the additional workload, such arrangements can increase the utilization of the hardware resources of arithmetic circuit 108. Moreover, by performing the computations for more processing nodes at a time, the throughput of weighted sums generation can also increase. By increasing the utilization and computation throughput of arithmetic circuit 108, the overall performance of hardware system 102 can be improved.

The extent of improvement in the overall performance of hardware system 102 achievable by pre-fetching a larger number of sets of weights, however, can be limited by the access latency introduced by memory device 102. Due to limited memory bandwidth, it takes a finite amount of time for memory device 102 to process read requests from data processing circuit 104 to fetch the weights, which leads to memory access latency. The memory access latency may increase with a larger number of sets of weights being pre-fetched from memory device 102. The memory access latency may even limit the achievable performance of hardware system 102.

Figure 1B:
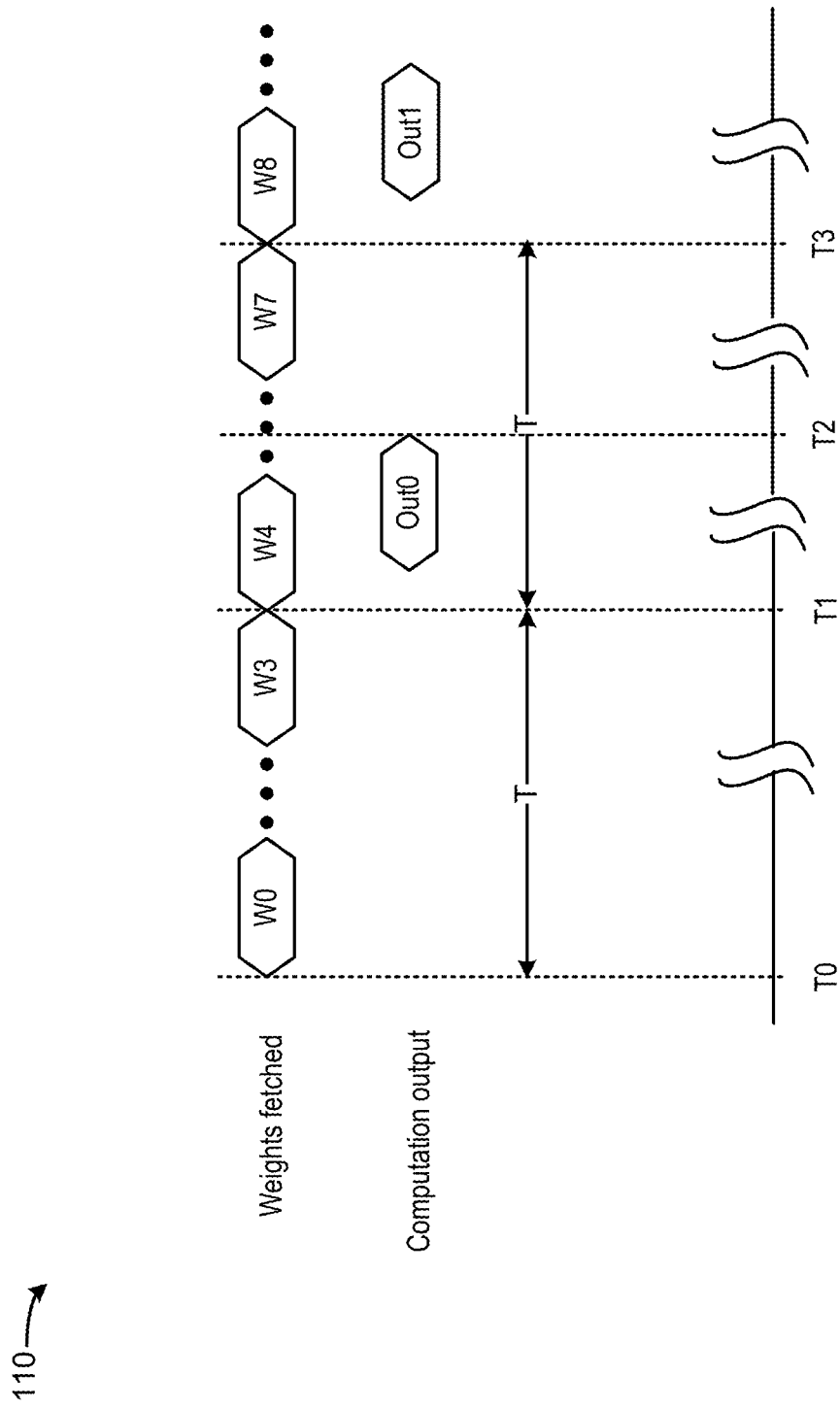

Reference is now made to FIG. 1B, which demonstrates the limit of memory access latency on achievable hardware performance. FIG. 1B is a timing diagram 110 which illustrates some of the operations by data processing circuit 104 with respect to time. In the example of FIG. 1B, processing circuit 104 can pre-fetch four weights W0, W1, W2, and W3 from memory device 102 between times T0 and T1, and then perform a batch of computations using the pre-fetched weights between times T1 and T2 to generate N-byte output data Out0. Moreover, between times T1 and T3, data processing circuit 104 can also pre-fetch four weights W4, W5, W6, and W7 from memory device 102 for the next batch of computations to generate N-byte output data Out1. As shown in the example of FIG. 1B, although processing circuit 104 is capable of completing a batch of computations before time T2, the next batch of computations cannot start until the time T3 after the pre-fetching of weights W4, W5, W6, and W7 completes. As a result, a pre-fetch time period of T seconds (e.g., between times T0 and T1, or between times T1 and T3, etc.) sets the upper bound for the achievable overall data throughput of processing circuit 104 at N/T byte/second.

Figure 1C:
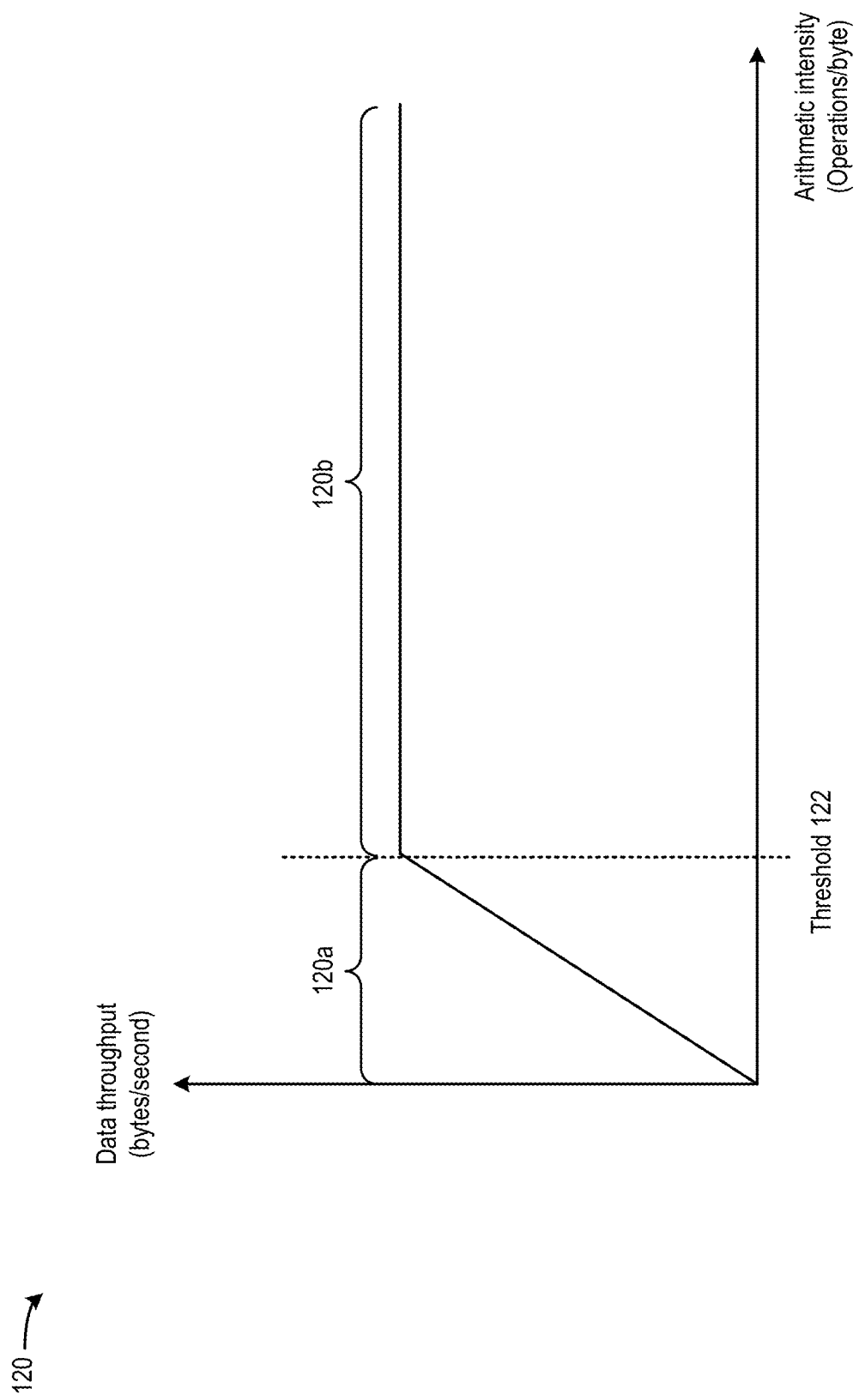

The limit of memory access latency on achievable hardware performance can also be visualized on a roofline model plot. FIG. 1C illustrates an example of a roofline model plot 120. The y-axis of plot 120 can refer to an upper bound for achievable data throughput. The unit of data throughput can be bytes/second. Moreover, the axis of plot 120 can be arithmetic intensity (also known as operational intensity), which can be based on a ratio between a number of arithmetic operations and the total size of memory data traffic. The unit of arithmetic intensity can be operations/byte. Arithmetic intensity increases when, for example, the number of arithmetic operations increases while the total size of memory data traffic decreases or remains stagnant.

As shown in FIG. 1C, plot 120 includes two regions 120a and 120b. In region 120a (on the left of arithmetic intensity threshold 122), the upper bound for achievable data throughput increases with the arithmetic intensity. Region 120a can correspond to a scenario where the hardware performance is bounded by the available memory bandwidth (and memory access latency), such that a reduction in the memory data traffic (and memory access latency) can lead to an increase in the arithmetic intensity and a corresponding increase in the achievable data throughput. On the other hand, in region 120b (on the right of arithmetic intensity threshold 122), the upper bound for achievable data throughput does not change with the arithmetic intensity, which can indicate that the hardware performance is no longer bounded by the available memory bandwidth. Region 120b can correspond to a scenario where the hardware performance can be further improved by, for example, increasing the available arithmetic hardware resources at data processing circuit 104 (e.g., by including additional arithmetic hardware to perform more arithmetic operations in parallel).

It is typically very challenging to improve available memory bandwidth. For example, to increase the rate of memory access, the memory device may need to be clocked at a higher clock rate. Moreover, the output bus of the memory device may need to be expanded to allow more data to be acquired in each clock cycle. The bus expansion also requires additional high-speed interface circuitries (e.g., driver and transmitter circuits) to interface with the expanded bus. All these can lead to substantial increase in power and chip area. Therefore, to avoid the hardware performance being limited by available memory bandwidth, it may be desirable to operate hardware system 100 in region 120b of plot 120.

Embodiments of the present disclosure relate to a computing system for performing neural-network processing of data. More specifically, the computing system may be coupled with a memory device configured to store a set of compressed weights. The computing system may also include a computing engine configured to perform computations for a neural network layer, and a configurable weight expansion engine coupled with the computing engine. The configurable weight expansion engine can acquire data including a set of compressed weights from the memory device, extract the set of compressed weights from the data, and generate a set of corresponding expanded (or uncompressed) weights from the compressed weights. The configurable weight expansion engine can provide the expanded weights to the computing engine to perform the computations for the neural network layer.

With embodiments of the present disclosure, the memory device can be operated to store and fetch weights in compressed form, which can reduce the memory data traffic for the neural network computations. As a result, the hardware performance can be less susceptible to the limit imposed by available memory bandwidth. Moreover, referring back to FIG. 1C, a reduction in memory data traffic can lead to an increase in the arithmetic intensity. With the increase in arithmetic intensity, the computing system can operate in the desirable region 120b of the roofline model where the maximum achievable data throughput is not bounded by available memory bandwidth, and the maximum achievable data throughput can be further increased by, for example, including additional hardware resources in the computing engine to perform more arithmetic operations in parallel. As a result, the performance of the computing system can be improved.

Figure 2:
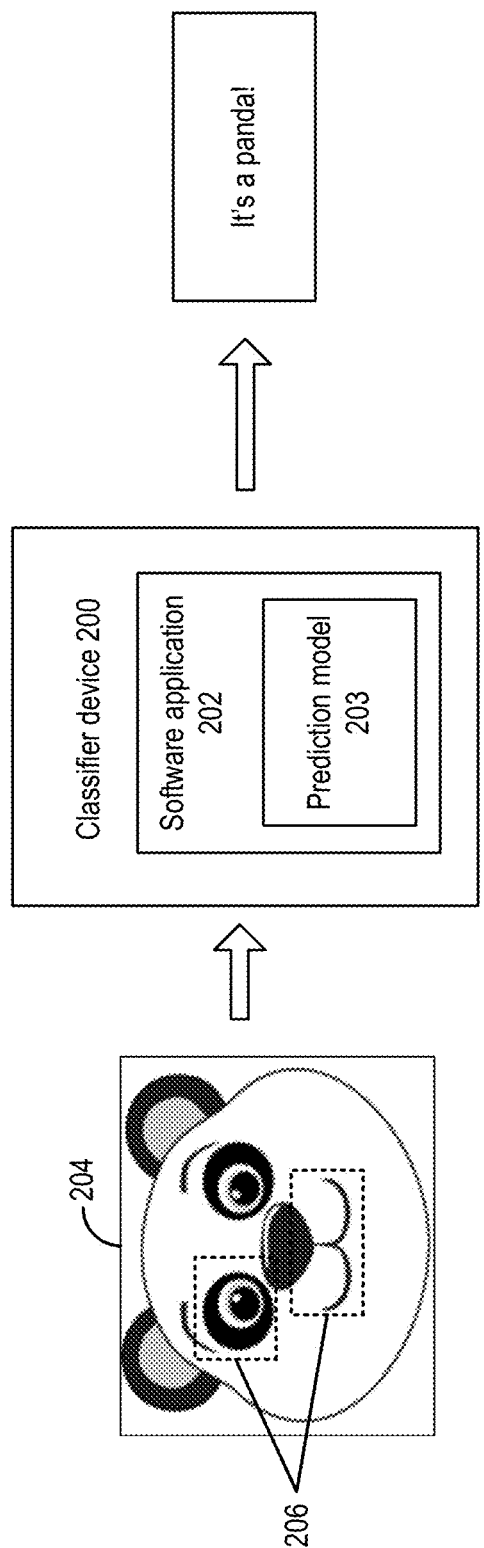
FIG. 2 illustrates an example classifier device 200 that uses techniques disclosed herein to process data.

FIG. 2 illustrates an example classifier device 200 that uses techniques disclosed herein to process data. Classifier device 200 can be, for example, a computing device operating a software application 202 and a prediction model 203 to predict information included in a data sequence, and perform a pre-determined function based on the prediction. For example, classifier device 200 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc.

The image recognition service can be provided in a multi-tenant compute service system. The multi-tenant compute service system may typically include a plurality of servers that can host data and can be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system, may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 2, the multi-tenant compute service system may provide the image recognition service when the client needs it and decommissioned when it is no longer needed, such that the resources supporting the image recognition service (e.g., access to software application 202, and the underlying hardware resources for processing software application 202) can be reallocated to other clients.

As shown in FIG. 2, software application 202 can receive pixel data of an image 204 from a user. Image 204 may include an array of pixels. Software application 202 can perform analysis on the pixel data, and predict one or more objects 206 depicted in image 204. The analysis may include, for example, comparing the pixel data against a set of pre-determined image features. As to be discussed in more detail below, software application 202 may employ prediction model 203 to compute a set of scores based on the pixel data of image 204. The set of scores may represent, for example, the likelihood of image 204 including the pre-determined image features. Software application 202 can then determine other information about the content of image 204 based on the scores. For example, based on the scores, software application 202 can determine that image 204 is an image of a panda.

Figure 3A:
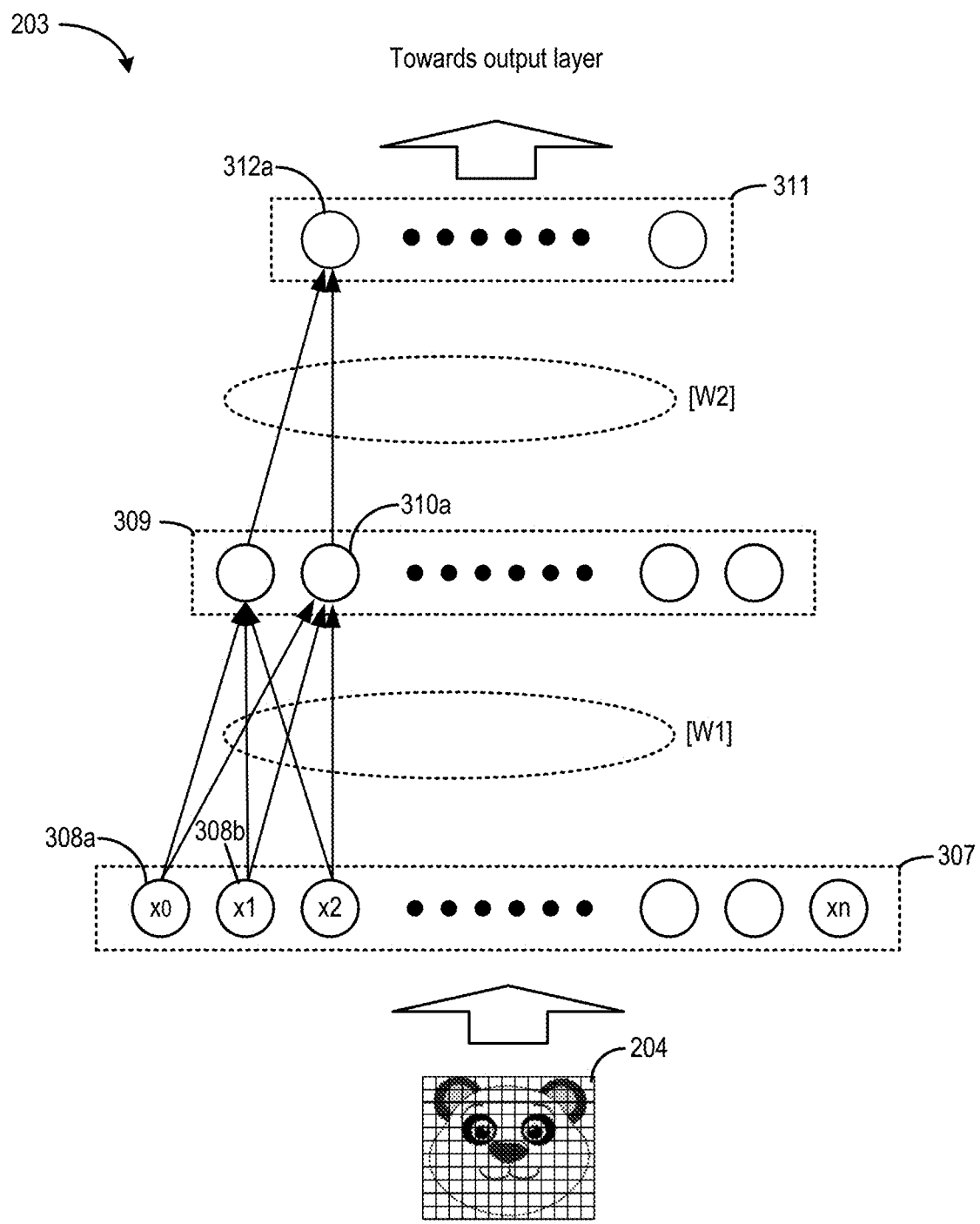
FIGS. 3A-3D are simplified block diagrams illustrating a prediction model and the computations that use techniques disclosed herein, according to certain aspects of the present disclosure.

Prediction model 203 can be in the form of an artificial neural network. The artificial neural network may include a plurality of processing nodes, with each processing node configured to process part of the input pixel data, or to further process the intermediate outputs from other processing nodes. FIG. 3A illustrates an example of prediction model 203 that uses techniques disclosed herein. In the example of FIG. 3A, prediction model 203 may be a multi-layer neural network such as a deep neural network (DNN), a convolutional neural network (CNN), etc. Prediction model 203 may include an input layer 307, a set of intermediate layers including intermediate layers 309 and 311, and an output layer (not shown in FIG. 3A).

Layer 307 may process pixel data representing different portions of image 204. For example, in the example of FIG. 3A, layer 307 may process the pixel data of image 304. Each processing node of layer 307 is assigned to receive a pixel value (e.g., $x_0$, $x_1$, $x_2$, . . . $x_n$) corresponding to a pre-determined pixel within image 304, and transmit one or more weights with the received pixel value to layer 309. In a case where prediction model 303 is a DNN, each processing node of layer 307 can be assigned a set of weights defined based on a matrix W1. Each processing node of layer 307 can send the received pixel value and the assigned weights to each processing node of layer 309. In a case where prediction model 203 is a CNN, groups of the processing nodes of layer 307 may share a set of weights, and each group may send the set of weights and the pixel values received by the group of processing nodes to a single processing node of layer 309.

Layer 309 may process the scaled outputs from layer 307 to generate a set of intermediate outputs. For example, assuming processing node 310a of layer 309 is connected to n processing nodes in layer 307, processing node 310a may generate a sum of the scaled outputs received from layer 307 based on the following equation:

$$sum_{310a} = \sum_{i=0}^{n}(W1_i \times x_i) \qquad \text{(Equation 1)}$$

Here, $sum_{310a}$ represents a sum generated by processing node 310a. $W1_i \times x_i$ represents a scaling of a particular pixel value (e.g., $x_0$) with the associated weight (e.g., W10) by a processing node of layer 307. In a case where prediction model 203 is a DNN, each processing node of layer 309 may generate the sum based on the scaling of pixel values from each processing node of layer 307, and then generate a sum (e.g., $Sum_{310a}$) by summing the scaled pixel values. The sum may also represent a dot-product between an input vector comprising a number of elements (e.g., pixel values) and a weight vector (e.g., W1).

Figure 3B:
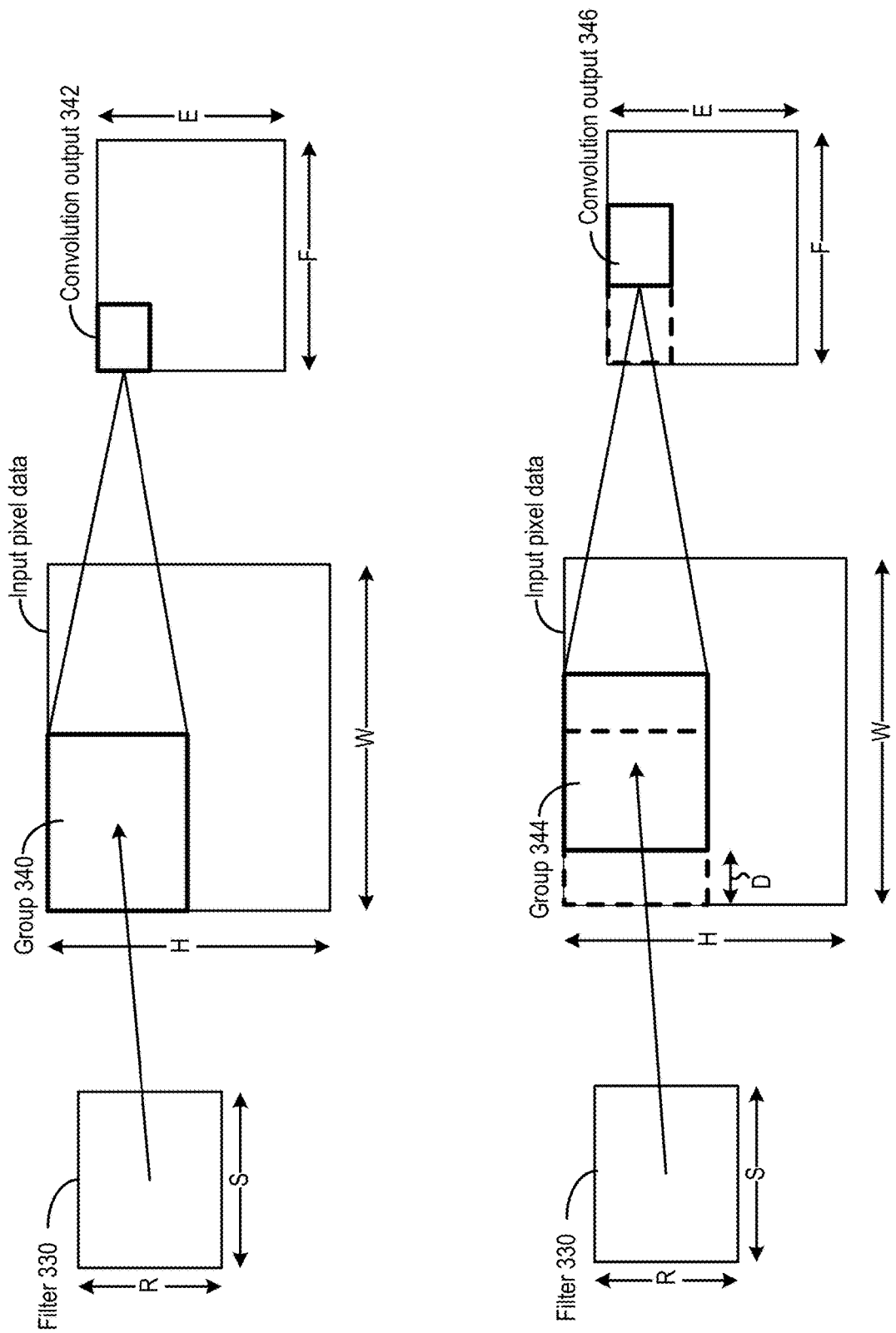

On the other hand, in a case where prediction model 203 is a CNN, each processing node of layer 309 may generate the sum based on the scaling of pixel values from a group of processing nodes of layer 307. The sum may represent a convolution result between a group of pixel values and a filter comprising the weight values. FIG. 3B illustrates an example of a convolution operation that layer 309 may perform. In FIG. 3B, filter 330 may include a two-dimensional array of weights. The weights in filter 330 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 309 (e.g., processing node 310a) can receive, from a group of processing nodes of input layer 307, a group 340 of pixel values corresponding to a first rectangular block of pixels from the input image, and generate a convolution output 342 based on a summation of multiplication results between each weight of filter 330 and each corresponding pixel in group 340 according to Equation 1, to generate a dot-product between a matrix represented by filter 330 and a matrix represented by group 340. Another processing node of layer 309 can also receive, from another group of processing nodes of input layer 307, a group 344 of pixel values corresponding to a second rectangular block of pixels from the input image, and generate a convolution output 346 based on a summation of multiplication results between each weight of filter 330 and each corresponding pixel in group 344 according to Equation 1, to generate a dot-product between the matrix of filter 330 and a matrix represented by group 340. In some examples, each convolution output in FIG. 3B (e.g., convolution output 342, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 3B, the convolution operations can be arranged in a sliding-window such that the second rectangular block overlaps, or is otherwise adjacent to, the first rectangular block in the input image. For example, in the example of FIG. 3B, D may be a distance of stride (in pixel) of the sliding-window for each convolution operation, such that the block of pixels corresponding to group 344 may be situated at a distance D (in terms of pixels) from the block of pixels corresponding to group 340, and the next block of pixels may also be situated at the same distance D from group 344. Other processing nodes of layer 309 may also receive groups of pixels corresponding to other rectangular blocks and generate other intermediate outputs. The convolution outputs can be part of a convolution output array 380 with a height of E rows and a width of F columns. The array of convolution outputs can have a smaller height and a smaller width than the input image. Rectangular blocks of the convolution outputs can be further grouped, and convolution operations can be performed at layer 311 between the groups of convolution outputs and another set of filter weights to generate another set of convolution outputs.

Figure 3C:
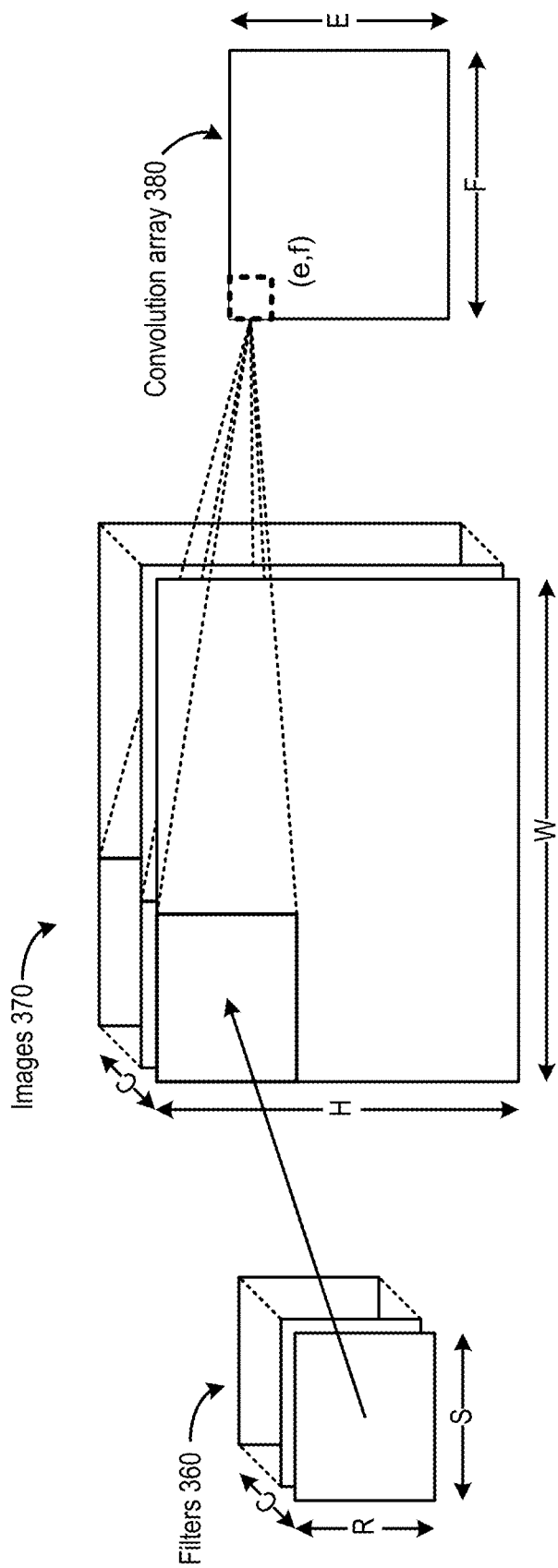

In some examples, the convolution operations can be performed between multiple images and multiple filters. For example, referring to FIG. 3C, a set of C filters 360 may correspond to a number (C) of images 370, and convolution operations can be performed between each filter of the set of filters 360 and blocks of pixels on the corresponding image of images 370. The convolution results for each filter-image pair can be summed to generate a convolution output as follows:

$$O_{e,f} = \sum_{r=0}^{R-1}\sum_{s=0}^{S-1}\sum_{c=0}^{C-1} X^c_{eD+r,fD+s} \times W^c_{r,s} \qquad \text{(Equation 2)}$$

Here, the convolution operation involves the images (or pixel arrays). $X^c_{eD+r,fD+s}$ which may refer to the value of a pixel at an image of index c, within the number (C) of images 370, with a horizontal pixel coordinate of eD+r and a vertical pixel coordinate of fD+s. D is the sliding-window stride distance, whereas e and f correspond to the location of the output in the convolution output array, which can also correspond to a particular sliding window. Further, r and s correspond to a particular location within the sliding window. A pixel at an (r,s) location and of an image of index c can also correspond to a weight $W^c_{r,s}$ in a corresponding filter of the same index c at the same (r,s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the images within the image set can be computed and then a sum of the partial sums for all images of the image set can be computed.

Moreover, in some examples, multiple sets of filters can be used to perform convolution operations with a set of images to generate a set of convolution output arrays, with each convolution output array corresponding to a set of filters. For example, the multiple sets of filters may correspond to multiple image features to be detected from the set of images, and each convolution output array corresponds to the detection results for each image feature from the set of images. For example, where M sets of filters are applied to C images to generate M convolution output arrays, Equation 2 can be updated as follows:

$$O^m_{e,f} = \sum_{r=0}^{R-1}\sum_{s=0}^{S-1}\sum_{c=0}^{C-1} X^c_{eD+r,fD+s} \times W^{c,m}_{r,s} \qquad \text{(Equation 3)}$$

Here, convolution output $O^m_{e,f}$ and weight $W^{c,m}_{r,s}$ has an index m corresponding to one of the M sets of filters.

Figure 3D:
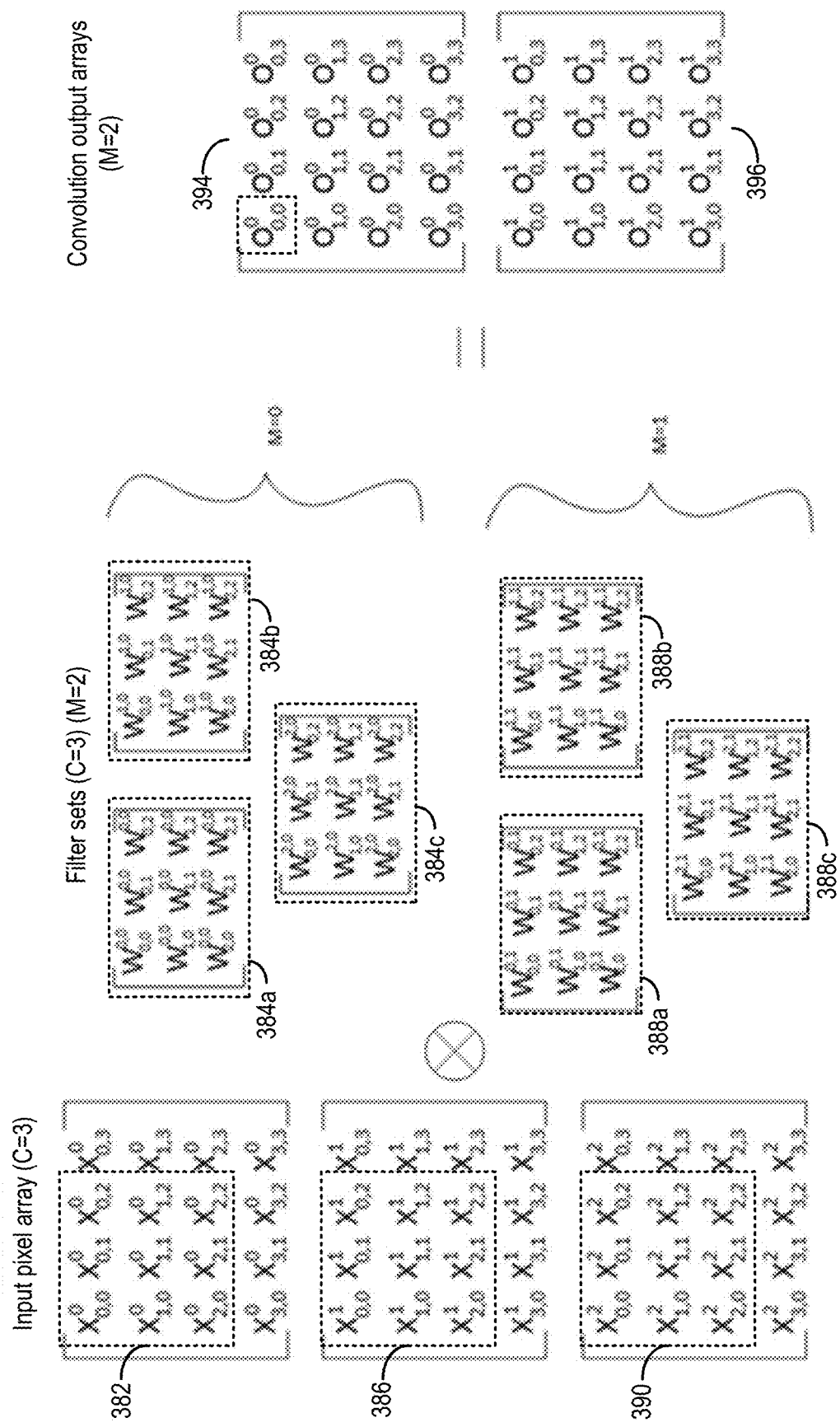

FIG. 3D illustrates an example of C sets of input data sets (with C=3) to be convolved with M sets of filters (with M=2). Each set of input data corresponds to the entries of a pixel group. For example, each of pixel groups 382, 386, and 390 may correspond to one input data set. Each of the M sets of filters includes a set of C filters which correspond to the C sets of input pixel arrays. In the example of FIG. 3D, there are two filter sets where the first filter set comprises filter arrays 384a, 384b, and 384c and the second filter set comprises filter arrays 388a, 388b, and 388c. The convolution operations generate M sets of output data sets, with each output data set corresponding to a convolution output array. In the example of FIG. 3D, two convolution output arrays 394 and 396 are generated. Each convolution output array corresponds to convolving one set (of the M sets) of filters with the input pixel arrays. For example, first element $O^0_{0,0}$ of convolution output array 394 can be generated by a sum of a dot-product between pixel group 382 and filter array 384a, a dot-product between pixel group 386 and filter array 384b, and a dot-product between pixel group 390 and filter array 384c.

Referring back to FIG. 3A, one processing node of layer 309 may be configured to generate one convolution output array, and a set M of processing nodes of layer 309 can correspond to a set M of convolution output arrays. The processing node of layer 309 can also post-process each convolution output with, for example, an activation function to generate a final output for layer 309. The activation function may translate the convolution output (or subsamples) into a decision of whether to forward the convolution output (or subsamples) to upper layers. The generation of the decision can be analogous to the firing of an actual biological neuron. An example of an activation function can be a rectified linear unit (ReLu) defined according to the following equation:

$$\text{ReLu}(y)=\max(0,y) \qquad \text{(Equation 4)}$$

A processing node of layer 309 (e.g., processing node 310a) may process the convolution output subsamples with the ReLu function to generate intermediate outputs based on Equation 4. Layer 311 may further process the intermediate outputs from layer 309 by, for example, performing additional convolution operations based on different sets of filters. The outputs from each processing node of layer 311 may be forwarded to other higher intermediate layers, or to an output layer (not shown in FIG. 3A). The output layer may form an output vector representing, for example, a probability that a certain image feature is included in image 204, and/or a probability that image 204 includes an image of a panda. For example, the output vector may be compared against a reference vector associated with a nose object of a panda, or a reference vector associated with a panda. A decision about whether image 204 is an image of a panda can be determined based on the comparison result.

Figure 4:
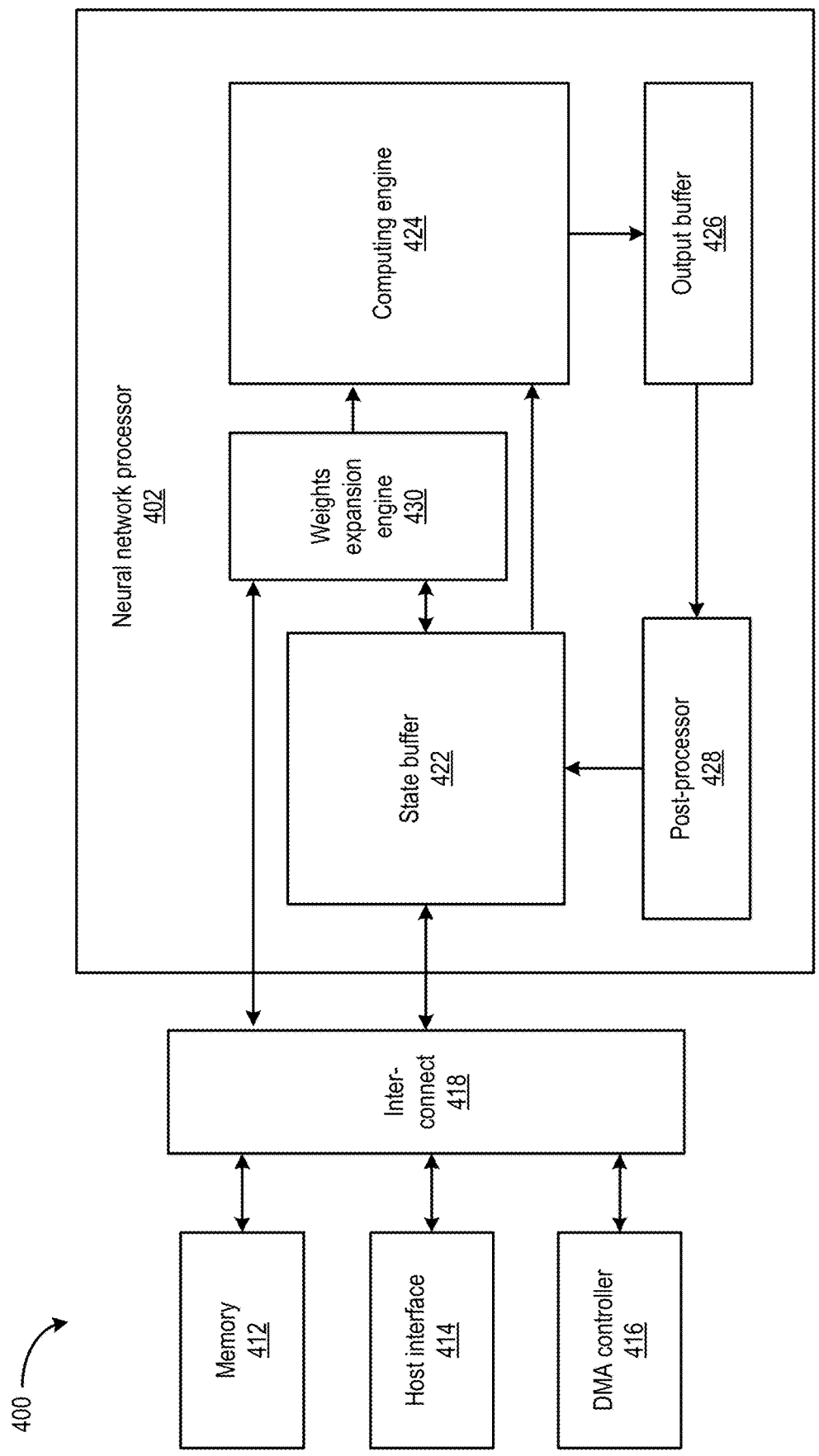
FIG. 4 illustrates an apparatus for implementing the prediction model of FIGS. 3A-3D, according to certain aspects of the present disclosure.

FIG. 4 shows an apparatus 400 according to some embodiments of the present disclosure. Apparatus 400 may be part of a computer system, e.g., a host server. Apparatus 400 may be part of a multi-tenant compute service system and can communicate with a host device (not shown in FIG. 4) to provide computing and memory resources for a computing service. For example, referring back to FIG. 2, apparatus 400 may provide computing and memory resources for computations with prediction model 203. A host device can operate software application 202 and communicate with apparatus 400 to perform one or more image recognition tasks based on computations with prediction model 203.

In the example of FIG. 4, apparatus 400 may include a neural network processor 402 coupled to memory 412, a direct memory access (DMA) controller 416, and a host interface 414 via an interconnect 418. As to be discussed in more detail, neural network processor 402 can provide the computing resources to support the computations with prediction model 203. Memory 412 may be configured to store the instructions, input data (e.g., pixel data of image 204) and the weights (e.g., the filter data) received from the host device. As to be discussed in more detail below, the weights stored in memory 412 can be in a compressed form or state. The weights can be converted into an expanded (or uncompressed) form or state, and the converted weights can be used for the computations with prediction model 203. Memory 412 may also be configured to store the output of neural network processor 402 (e.g., one or more image recognition decisions on the input images) at memory 412. Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between neural network processor 402 and the host device. For example, as discussed above, the host device can store the instructions, input data, and the weights at memory 412. The host device can provide the memory addresses for the stored instructions, data, and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the neural network computations for prediction model 203. In the example of FIG. 4, neural network processor 402 may be an integrated circuit, such as a system on chip (SoC), and can include a number of circuit components, a state buffer 422, a computing engine 424, an output buffer 426, and a post-processor 428. In addition, neural network processor 402 may also include a weights expansion engine 430 to convert the weights from a compressed form (as stored in memory 412) to the expanded form and provide the converted weights to computing engine 424, as to be discussed in detail below.

State buffer 422 may be configured to provide caching of data used for computations at computing engine 424. The data cached at state buffer 422 may include, for example, the input data and weights obtained from memory 412, output data generated by post-processor 428, etc. The weights can be in a compressed form, as discussed above. The caching can reduce the effect of memory access bottleneck (e.g., caused by the latencies at memory 412, DMA controller 416, interconnect 418, etc.) on the performance of computing engine 424. State buffer 422 can be an on-chip memory device and may include, for example, static random access memory (SRAM).

Figure 5A:
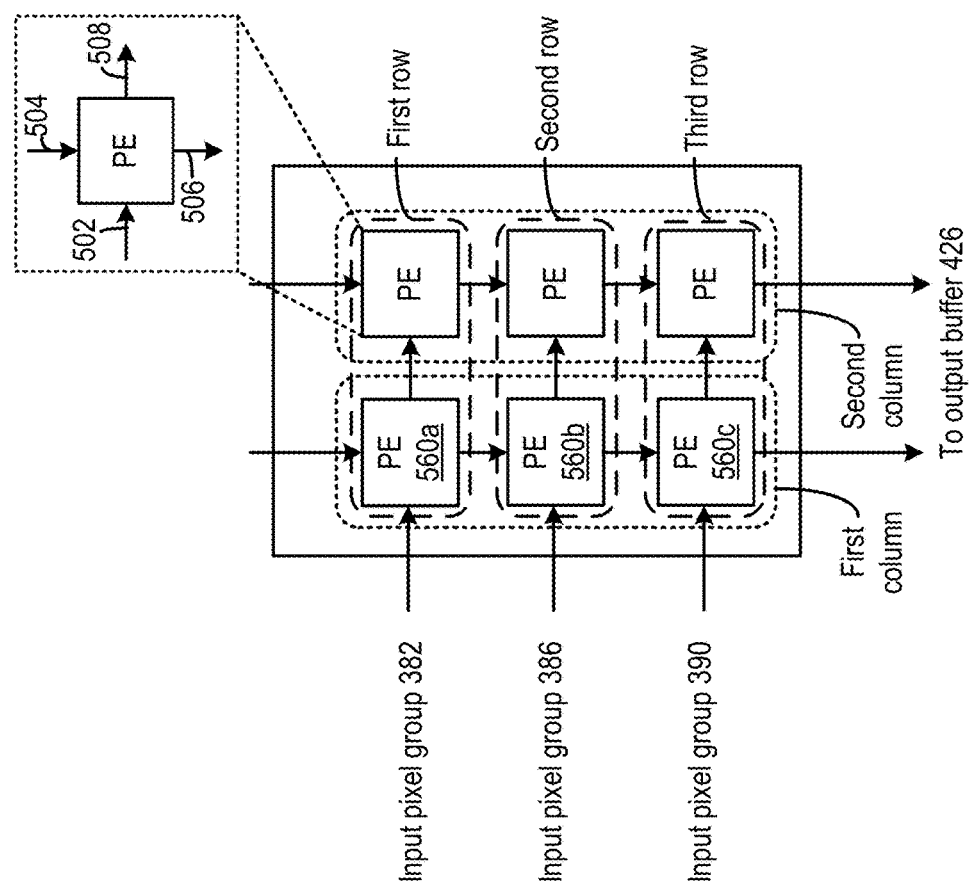
FIGS. 5A-5D are simplified block diagrams illustrating some of the internal components of the apparatus of FIG. 4 and certain performance metrics, according to certain aspects of the present disclosure.

Computing engine 424 may include a set of processing elements (PE) configured to perform one or more arithmetic operations involved in neural network computations. Computing engine 424 may include a two-dimensional array of processing elements arranged in multiple rows and columns similar to a systolic array. Blocks of processing elements may include arithmetic circuit, and can be provided with input data to perform parallel arithmetic operations for computations of a neural network layer. Reference is now made to FIG. 5A, which illustrates an example of using computing engine 424 for convolutional neural network computations. In the example of FIG. 5A, computing engine 424 includes a 2×3 array with two PEs in each row and three PEs in each column. The 2×3 array can be enabled (by providing with input data) to perform, for example, the convolution operations described in FIG. 3D. Each PE may include a row input bus 502, a column input bus 504, a column output bus 506, and a row output bus 508. A PE may receive inputs from a left PE of the same row (or from external circuitries) via row input bus 502. The PE may also receive inputs from an above PE of the same column (or from external circuitries) via column input bus 504. The PE may perform arithmetic operations based on the inputs, and transmit the result of the arithmetic operations to a lower PE of the same column below (or to external circuitries) via column output bus 506. The PE may also forward the inputs to a right PE of the same row, via row output bus 508.

Each row of computing engine 424 may process one input data set comprising multiple input data elements, whereas each column of computing engine 424 generates a weighted sum of input data elements of different input data sets. As an illustrative example, in a case where computing engine 424 is to process pixel groups 382, 386, and 390 of FIG. 3D, a first row may receive elements of pixel group 382, a second row may receive elements of pixel group 386, and a third row may receive elements of pixel group 390. Each PE includes a multiplier and an adder to handle one input data element at a time. A PE may receive one input data element and a weight (e.g., from row input bus 502) and generate, using the multiplier, a multiplication product to represent a weighted input data element. Moreover, the PE also receives a partial weighted sum from the PE above. The partial weighted sum represents the weighted sum of input data elements of input data sets received by each row above that PE. The PE adds the weighted input data element to the partial weighted sum, and passes the updated partial weighted sum to the PE below, and the PEs at the third row can generate a weighted sum of input data elements received by the three rows.

Figure 5B:
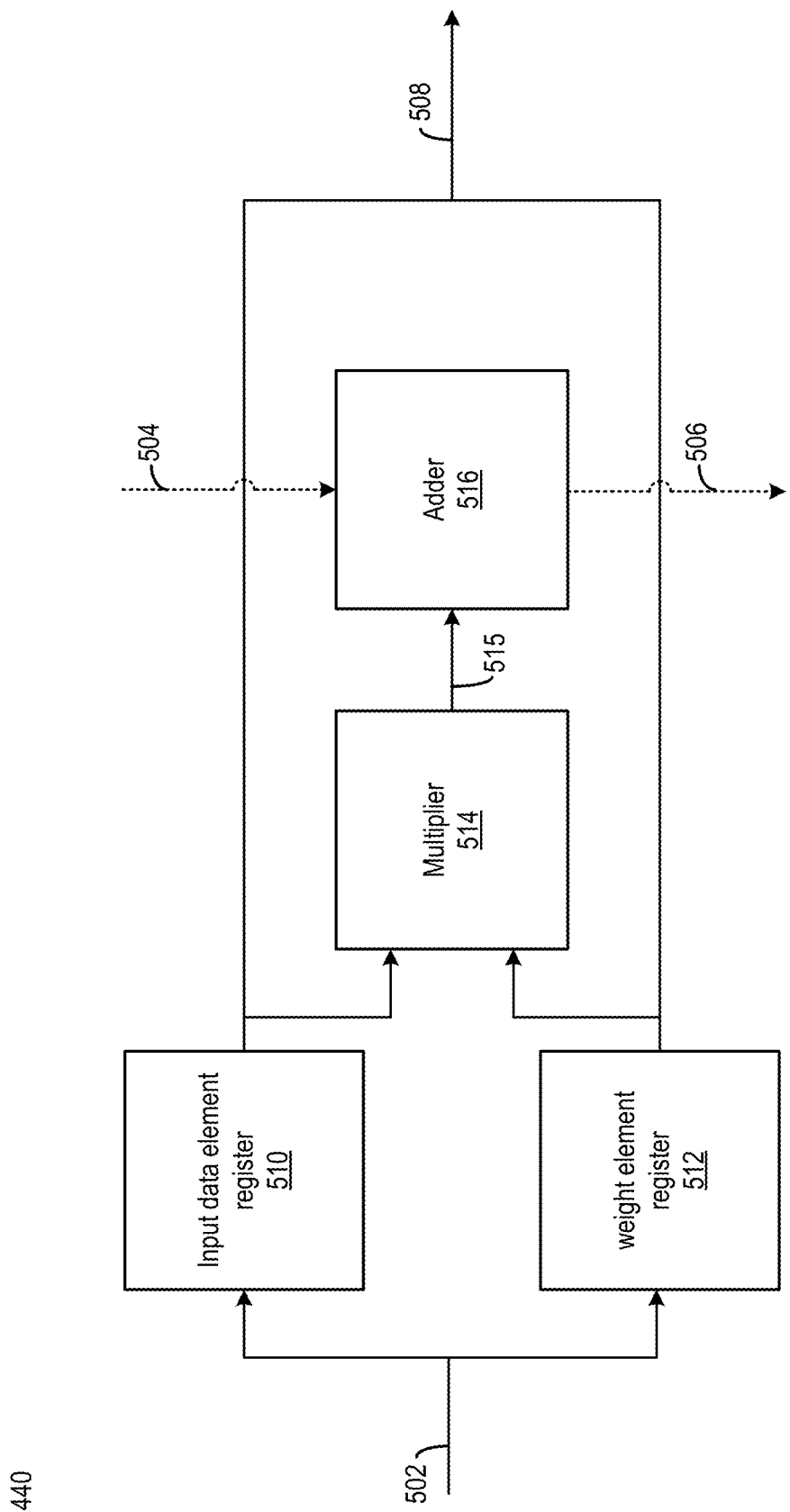

The operations of each PE of computing engine 424 can be synchronized to a continuous clock signal to improve the interoperability between computing engine 424 and other components of neural network processor 402. Reference is now made to FIG. 5B, which illustrates an example of internal components of a PE. In the example of FIG. 5B, a PE may include an input data element register 510, a weight element register 512, a multiplier 514, and an adder 516. Input data element register 510 can obtain, from row input bus 502, an input data element, and store the input data element. Weight element register 512 can obtain, from row input bus, a weight element, and store the weight element. Both input data element register 510 and weight element register 512 can be clocked by a continuous clock signal that is shared by other PEs. In one clock cycle, input data element register 510 and weight element register 512 can provide, respectively, an input data element and a weight element to multiplier 514 to generate a weighted input data element 515. Adder 516 can receive a partial weighted sum from a PE above via column input bus 504, add weighted input data element 515 to the partial weighted sum, and transmit the updated partial sum to a PE below via column output bus 504. Input data element register 510 and weight element register 512 also transmits, respectively, the input data element and a weight element to another PE in the next column via output row bus 508. The input data element register and weight element register of that PE in the next column can latch in the input data element and the weight element in the next clock cycle.

In some examples, the weights can be pre-fetched and stored in the weight element register 512 of each PE. A stream of input data elements can then be supplied to each row sequentially in each clock cycle, and the PE can perform the computations using multiplier 514 and adder 516 to apply the stored weight element to the received input data element as discussed above. Referring back to FIG. 5A, six weights can be pre-fetched from state buffer 442 and stored in the PEs. The PEs of the first column can store a weight from filter arrays 384a, 384b, or 384c. The PEs of the second column can store a weight from filter arrays 388a, 388b, or 388c. In three clock cycles, the first column can output a sum of $W_{0,0}^{0,0} \times X_{0,0}^{0} + W_{0,0}^{1,0} \times X_{0,0}^{1} + X_{0,0}^{2,0} \times X_{0,0}^{2}$, which is a weighted sum of the first input data element of pixel groups 382, 386, and 390. The sum can be used for the computation of the first element ($O_{0,0}^{0}$) of convolution output array 394 of FIG. 3D. Moreover, the second column can output a sum of $W_{0,0}^{0,1} \times X_{0,0}^{0} + W_{0,0}^{1,1} \times X_{0,0}^{1} + W_{0,0}^{2,1} \times X_{0,0}^{2}$, which is also a weighted sum of the first input data element of pixel groups 382, 386, and 390. The sum can be used for the computation of the first element ($O_{0,0}^{1}$) of convolution output array 396 of FIG. 3D. While each column may generate the weighted sum in multiple passes, the generation of the weighted sums by each column can be performed in parallel to improve the rate of output data generation as well as the throughput of the neural network processing. Post-processor 428 can then perform post-processing (e.g., applying an activation function) on the elements of the convolution output arrays provided by output buffer 426 to generate final outputs for the neural network layer.

Figure 5C:
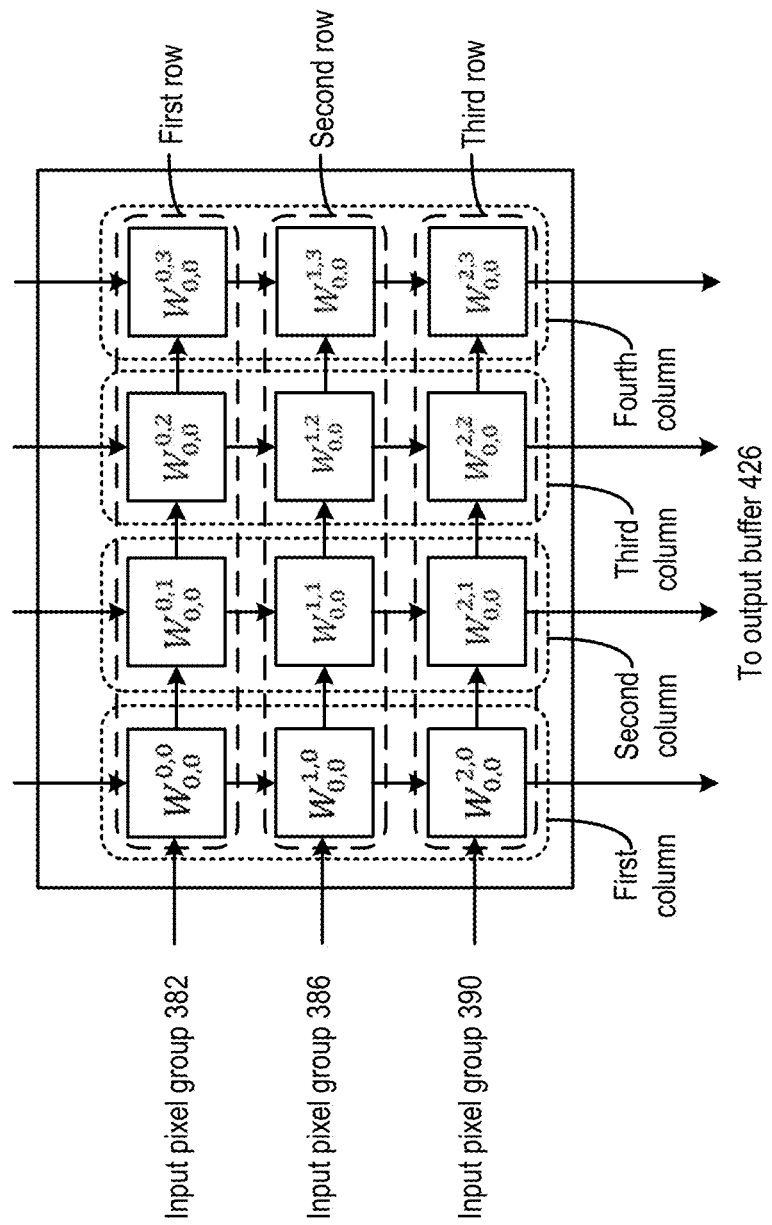

To further improve the throughput of the convolution output generation and the utilization of computing engine 424, additional weights can be pre-fetched from state buffer 422 (and from memory 412) and stored in additional PEs. Those additional PEs can apply the weights onto the input data elements to generate additional weighted sums and additional outputs. Reference is now made to FIG. 5C, which illustrates an example of expediting the convolutional neural network computations at computing engine 424. In the example of FIG. 5C, three rows and four columns of PEs can be enabled. Similar to the configuration of FIG. 5A, the first row may receive elements of pixel group 382, the second row may receive elements of input pixel array 386, and the third row may receive elements of input pixel array 390. On the other hand, additional weights can be pre-fetched and stored in the additional columns. In the example of FIG. 5C, 12 weights (versus six weights in FIG. 5A) can be pre-fetched and stored in the PEs. Each PE in the first column and the second column can store a weight from filter arrays 388a, 388b, or 388c, whereas each PE in the third column and in the fourth column can store a weight from filter arrays 388a, 388b, or 388c.

The pre-fetching of additional weights enables the number of passes to be reduced by half. For example, as discussed above, in the configuration of FIG. 5A where six weights are stored, in the first pass the first column generates a weighted sum of the first input data elements from each pixel group ($W_{0,0}^{0,0} \times X_{0,0}^{0} + W_{0,0}^{1,0} \times X_{0,0}^{1} + W_{0,0}^{2,0} \times X_{0,0}^{2}$) to generate the first element ($O_{0,0}^{0}$) of convolution output array 394, whereas the second column can generate the first element ($O_{0,0}^{1}$) of convolution output array 396. In the configuration of FIG. 5C, additional output sets can also be generated. For example, the third column can generate the first element ($O_{0,0}^{2}$) of a third convolution output array, whereas the fourth column can generate first element ($O_{0,0}^{3}$) of a fourth convolution output array. With the configuration of FIG. 5C, more outputs can be generated at any given time, which can increase the output data throughput of computing engine 424. Moreover, the utilization rate of computing engine 424 can also be improved by utilizing additional PEs (which may otherwise be idle) for the computations.

While pre-fetching additional weights can potentially increase the throughput of convolution output array generation, the improvement in the throughput can be limited by available memory bandwidth at, for example, state buffer 422 and memory 412. To mitigate the effect of available memory bandwidth, a compressed version of the weights can be stored in state buffer 422 and memory 412. The compressed weights can have smaller data size than the weights that are used by multiplier 514 to perform the multiplication. As an illustrative example, multiplier 514 may be a 8-bit multiplier to perform multiplication with an 8-bit weight. In contrast, the compressed weights can be 2-bit or 4-bit numbers. The 2-bit or 4-bit compressed weights can be fetched from state buffer 422 and can be converted into 8-bit expanded weights. The 8-bit expanded weights can then be stored in weight element register 512 of each PE for the computations. By fetching the compressed weights, the memory data traffic can be reduced, and the effect of limited memory bandwidth on the performance of neural network processor 402 can be reduced.

Figure 5D:
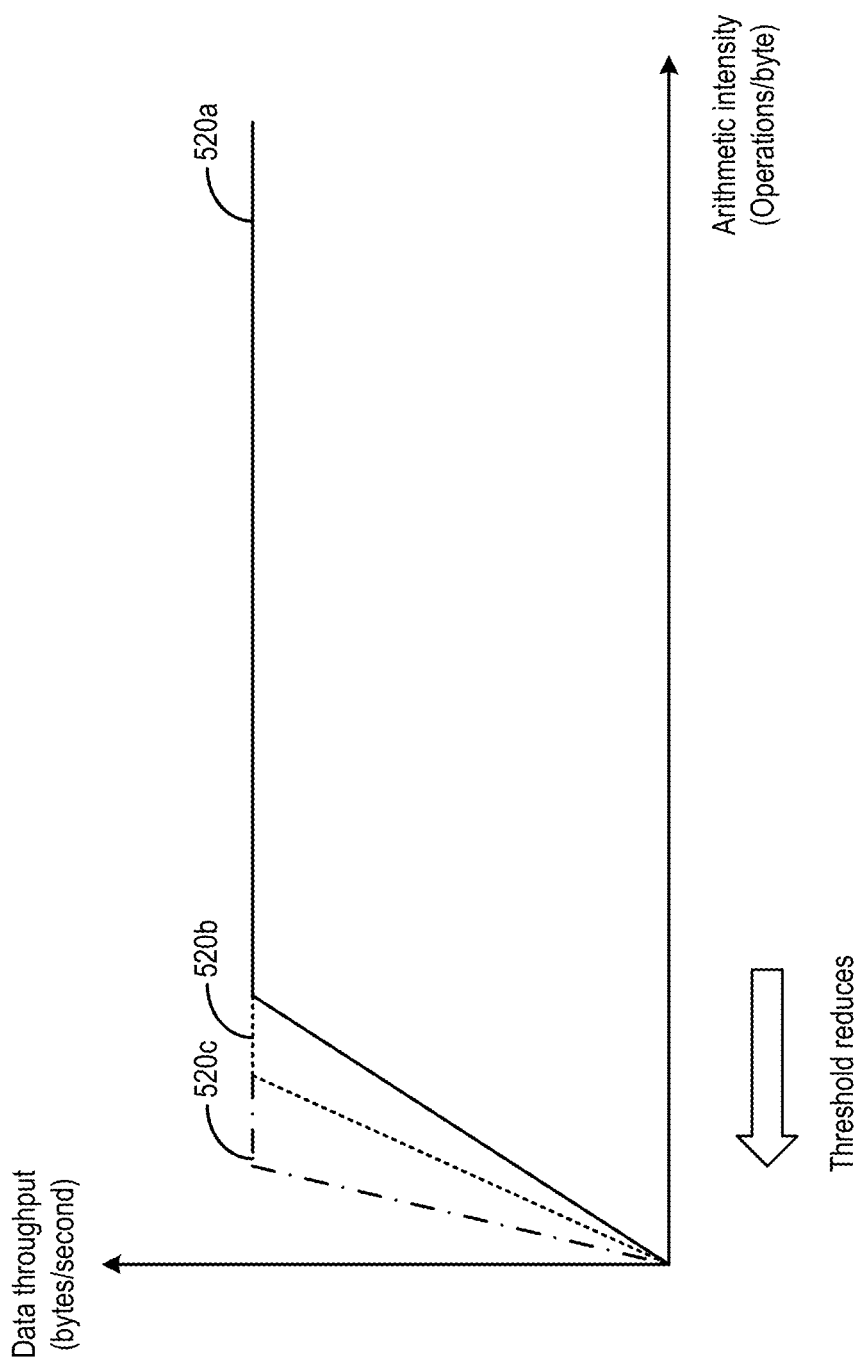

The effect of fetching the compressed weights can be visualized in roofline model plots of FIG. 5D, which shows plot 520a representing fetching of 8-bit weights, plot 520b representing fetching of 4-bit weights, and plot 520c representing fetching of 2-bit weights. As shown in FIG. 5D, the fetching of compressed weights can lead to higher data throughput for the same arithmetic intensity. Moreover, by reducing the memory data traffic, the arithmetic intensity threshold (where the hardware performance is no longer bounded by memory bandwidth) also reduces, which makes it more likely that neural network processor 402 can operate in the desirable region of the roofline model plot where the hardware performance is not limited by available memory bandwidth.

As discussed above, the fetching of compressed weights, as well as the conversion of compressed weights to expanded weights, can be performed by weights expansion engine 430. Referring to FIG. 4, in a first example, state buffer 422 can obtain a set of compressed weights (e.g., 2-bit weights) from memory 412 via, for example, DMA controller 416 and Interconnect 418. Weights expansion engine 430 can obtain the set of compressed weights from state buffer 422, convert the set of compressed weights to expanded weights, and provide the expanded weights to computing engine 424. In a second example, weights expansion engine 430 can also obtain the set of compressed weights (e.g., 2-bit weights) from memory 412 via, for example, DMA controller 416 and Interconnect 418, convert the set of compressed weights to expanded weights, and store the expanded weights in state buffer 422. State buffer 422 can then transmit the expanded weights to computing engine 424 at a later time when the arithmetic operations that use these expanded weights start at computing engine 424. The arrangements in the second example can be used to, for example, decouple the conversion operations of the compressed weights at weights expansion engine 430 and the fetching of the expanded weights to computing engine 424, to avoid the conversion operations becoming a bottleneck for the computations at computing engine 424 while the memory access latency for the expanded weight at state buffer 422 is relatively small and does not affect the performance of computing engine 424 in a substantial way (e.g., in a case where state buffer 422 is a fast on-chip memory comprising static random access memory (SRAM) devices). Staging can be arranged such that when state buffer 422 fetches a first set of expanded weights to computing engine 422, weights expansion engine 430 can perform conversion operations to generate a second set of expanded weights, to improve the efficiency of the weight conversion and fetching operations.

Figure 6A:
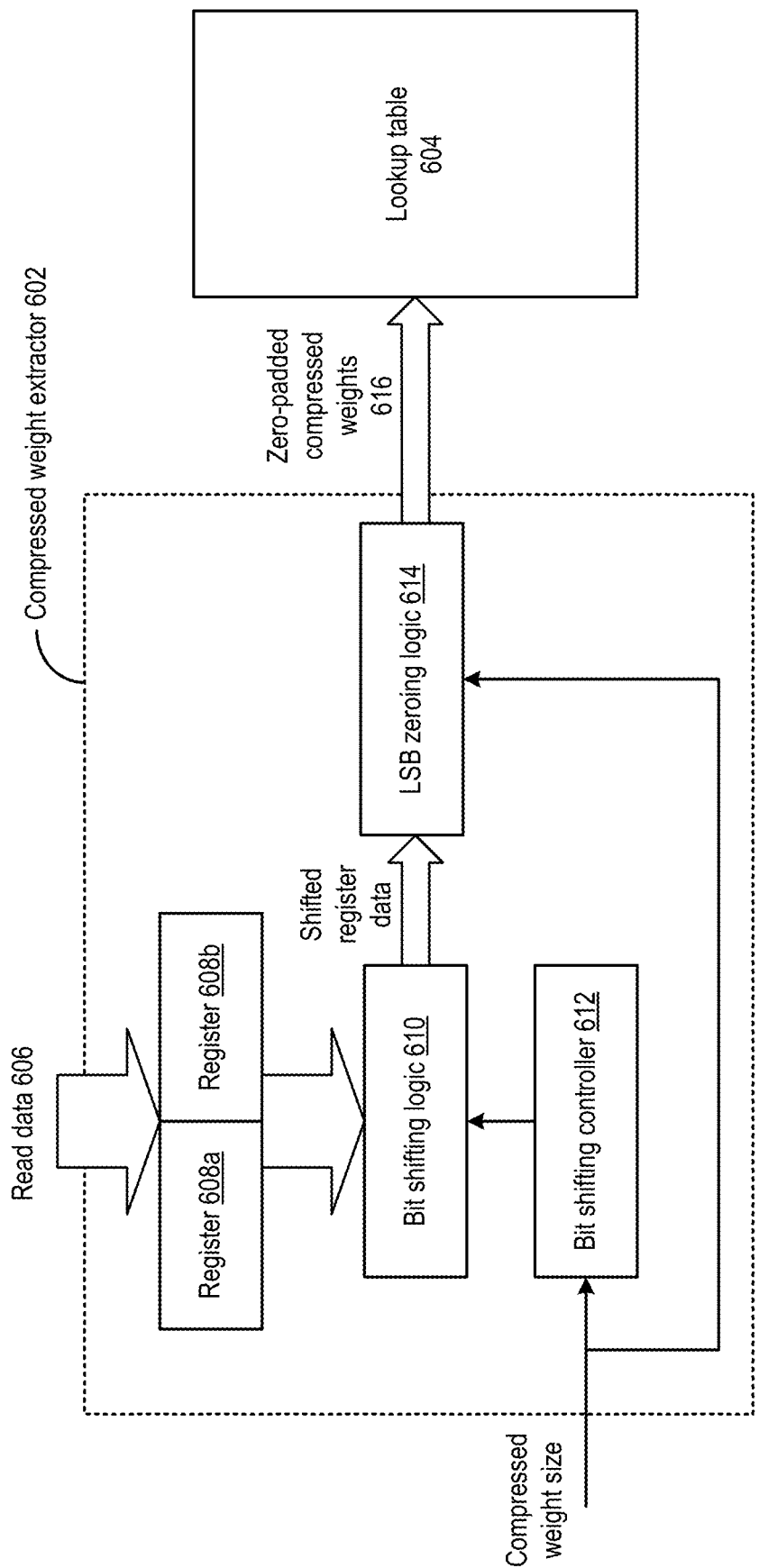
FIGS. 6A-6B are simplified block diagrams illustrating some of the internal components of the apparatus of FIG. 4, according to certain aspects of the present disclosure.

Reference is now made to FIG. 6A, which illustrates an example of components of weights expansion engine 430. As shown in FIG. 6A, weights expansion engine 430 includes a compressed weights extractor 602 and a lookup table 604. Compressed weights extractor 602 interfaces with state buffer 422, and can perform read operations at state buffer 422 to acquire read data 606 including the compressed weights. Compressed weights extractor 602 can extract one or more compressed weights from read data 604 based on configuration information indicating a size (e.g., a number of bits) of the compressed weights. An extracted compressed weight can be zero-padded to generate an input with a pre-determined length for lookup table 604. Lookup table 604 may map the zero-padded compressed weight to a corresponding expanded weight. The expanded weights can then be fetched by computing engine 424 for neural network computations.

In some examples, the extraction of compressed weights by compressed weight extractor 602 can be sequential (e.g., extracting one compressed weight at a time) based on bit-shifting of read data 606. In the example of FIG. 6A, compressed weight extractor 602 may include hardware components including registers 608a and 608b, bit shifting logic 610, and bit shifting controller 612. Read data 606 may comprise first read data and second read data and can be obtained in two read operations directed to two consecutive memory addresses. Register 608a may store the first read data, whereas register 608b may store the second read data. Such arrangements allow extraction, by continuous bit-shifting, of a weight value split between the first read data stored in a first memory address and the second read data stored in the second memory address. After the weights are extracted, compressed weight extractor 602 can obtain a third read in a subsequent read operation, and store the second data in register 608a and the third data in register 608b to continue the extraction of the weights including any weight value split between the second data and the third data.

To extract one compressed weight from read data 606, compressed weight extractor 602 can store the read data 606 in registers 608a and 608b. Register 608a and 608b, together with bit shifting logic 610, can be part of a shift register. Bit shifting logic 610 can be controlled by bit shifting controller 612 to perform right-shifting of the data stored in registers 608a and 608b based on a size of the compressed weights to extract each compressed weight. The right-shifted data in register 608b includes a compressed weight at the most significant bits (MSB). The right-shifted data can then be processed by LSB zeroing logic 614, which retains the MSBs containing the compressed weight and converts the remaining LSBs to zeros, to generate zero-padded compressed weights 616. The zeroing of LSBs can be performed to ensure that lookup table 604 maps the compressed weights properly, as to be described in more detail below. In some examples, LSB zeroing logic 614 can perform the zeroing operation by generating a bit mask with a number of MSBs corresponding to the compressed weight size set to one and the remaining LSBs set to zero, and performing an AND operation between the bit mask and the content of register 608b.

As an illustrative example, 16-bit read data 606 "1001110100000000" is acquired from state buffer 422 (or from memory 412), and four 2-bit compressed weights ("10", "01", "11", and "01") are to be extracted from read data 606. Two identical copies of read 606 can be stored in registers 608a and 608b. Bit shifting controller 612 can control bit shifting logic 610 to right-shift the content in registers 608a and 608b by two bits at a time (e.g., for each clock cycle). The following Table 1 illustrates the content of registers 608a and 608b as well as zero-padded compressed weights 616 for each right-shifting operation:

TABLE 1

| Right-shifting operation | Content of register 608a | Content of register 608b | Zero-padded compressed weights 616 |
|---|---|---|---|
| Not started | 10011101 | 00000000 | N/A |
| After first operation | 00100111 | 01000000 | 01000000 |
| After second operation | 00001001 | 11010000 | 11000000 |
| After third operation | 00000010 | 01110100 | 01000000 |
| After fourth operation | 00000000 | 10011101 | 10000000 |

Lookup table 604 can provide a mapping between zero-padded compressed weights 616 and the corresponding expanded weights. Lookup table 604 may include a set of multiplexers and a set of programmable registers. The programmable registers can store a set of expanded weights, and the multiplexers can select one of the expanded weights as an output. The selection can be based on control signals derived from an input zero-padded compressed weight 616. The mapping between the compressed weights and the expanded weights can be updated by, for example, updating the expanded weights stored in the set of programmable registers.

In some examples, lookup table 604 can store mapping information for mapping compressed weights of different sizes (e.g., 2 bits or 4 bits) to their corresponding expanded weights (e.g., 8 bits). Because lookup table 604 maps compressed weights of different sizes, the zeroing of LSBs by LSB zeroing logic 614 can be performed to ensure that lookup table 604 handles compressed weights of different sizes properly and does not confuse, for example, a 4-bit compressed weight as a 2-bit compressed weight. For example, a zero-padded 8-bit compressed weight generated based on a 4-bit compressed weight always has four zero LSBs, whereas a zero-padded 8-bit compressed weight generated based on a 2-bit compressed weight always has six zero LSBs. By referring to the number of zero LSBs included in the zero-padded compressed weight, lookup table 604 can determine which mapping information to use to map a compressed weight to its corresponding expanded weight. On the other hand, control signals can be generated based on MSBs (e.g., the first 2 bits for 2-bit compressed weight) can be used to generate the control signals to select the corresponding expanded weight. In one example, a multiplexer can be configured to provide a set of expanded weights for selection based on the number of zero LSBs included in a zero-padded compressed weight, whereas the MSBs of the zero-padded compressed weight can be input as the select bits for the multiplexer to select one of the set of expanded weights.

The capability of lookup table 614 mapping compressed weights of different sizes to a set of expanded/uncompressed weights enables dynamically switching the sizes of compressed weights to be pre-fetched and converted. The switching can be controlled by, for example, software application 202, by a hardware controller that controls the operations of neural network processor 402 (not shown in FIG. 4). The switching can be based on various factors. As an illustrative example, a lower neural network layer typically includes more processing nodes and performs more computations than an upper neural network layer. For lower neural network layer computations, it may be advantageous to pre-fetch a large number of smaller-size compressed weights (e.g., 2-bit weights) to speed up the computation while minimizing the memory data traffic to avoid the computation throughput being limited by available memory bandwidth. On the other hand, a higher neural network layer typically includes fewer processing nodes and performs fewer computations. In such a case, pre-fetching a larger number of weights may not lead to as big throughput improvement as the case for lower neural network computations. Therefore, for higher neural network layer computations, the weights expansion engine 430 can be bypassed, and regular uncompressed 8-bit weights can be provided to computation engine 424. Such arrangements allow greater operational flexibility at neural network processor 402, which can in turn improve the performance of the system.

To support the mapping of compressed weights of different sizes, memory 412 and state buffer 422 can store multiple sets of compressed weights, with each set having a different size (e.g., 2-bit versus 4 bit) and mapped to the same set of expanded/uncompressed weights. Based on an instruction to pre-fetch compressed weights of a pre-determined size (e.g., from software application 202, a hardware controller, etc.), weights expansion engine 430 can acquire the compressed weights of the pre-determined size from state buffer 422 and generate the expanded/uncompressed weights using lookup table 614.

There are different ways of mapping the compressed weights to the expanded/uncompressed weights, such as quantization. In the process of quantization, a numeric range of the uncompressed weight can be divided into multiple quantization sub-ranges, with each quantization sub-range being associated by a compressed weight. An uncompressed weight falling within a particular quantization sub-range can be represented by the compressed weight associated with that quantization sub-range. The quantization can be linear. As an illustrative example, to perform a linear quantization of an 8-bit uncompressed weight into a 4-bit compressed/quantized weight, the numeric range of the 8-bit weight (−127 to 127) can be divided into 16 equal quantization sub-ranges ($2^4$), and an 8-bit weight falling within one of the sub-range can be represented by a 4-bit compressed weight associated with that quantization sub-range. In a reverse process of de-quantization to obtain an uncompressed/expanded weight from a compressed/quantized weight, a 4-bit compressed/quantized weight can be mapped back to an 8-bit number representing a uncompressed/expanded weight. The 8-bit number may be, for example, the mid-point of the quantization sub-range associated with the 4-bit compressed/quantized weight.

In some examples, non-linear quantization can also be performed to reduce the average quantization error. The non-linear quantization can be based on, for example, a density distribution of the uncompressed weights. The density distribution can reflect a frequency or a probability of a particular weight value being used for the computations. The density distribution can be determined based on various criteria. For example, the density distribution can be based on a history of usage pattern of weights for a particular neural network layer, for a particular application, for a particular type of input data (e.g., different weights distribution for processing images versus audio data), etc. As discussed above, the weights used for the computations are obtained through a training process. Typically some weight values are used more often (or more likely generated by the training process) to scale the input data compared to other weight values. The more-frequently (or more-likely) used weights can be mapped to smaller quantization sub-ranges, whereas the less-frequently (or less-likely) used weights can be mapped to larger quantization sub-ranges. As a result, the average quantization error, which takes into account the frequency (or probability) of a particular uncompressed weight being used and the associated quantization error, can be reduced. After the training process and a set of uncompressed weights are obtained, a set of uncompressed weights can be quantized using a non-linear quantization scheme (e.g., based on the density distribution of the uncompressed weights) into a set of corresponding compressed/quantized weights, and the compressed/quantized weights can be stored in memory 412 and fetched to state buffer 422.

Figure 6B:
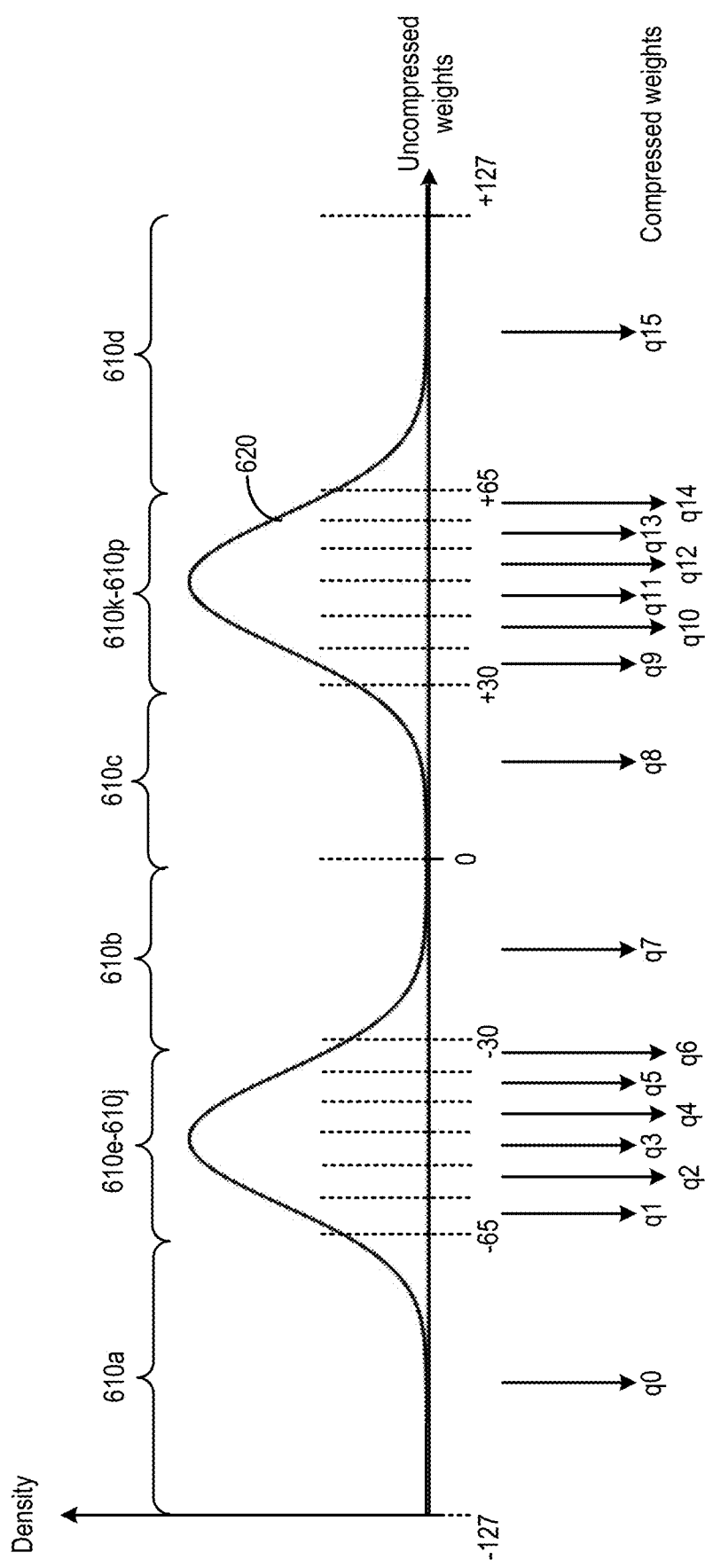

FIG. 6B illustrates an example of a non-linear quantization scheme. The y-axis represents the density distribution of the uncompressed 8-bit weights, whereas the x-axis represents the entire numeric range of the 8-bit weights (−127 to 127). As shown in FIG. 6B, the numeric range of 8-bit weights (−127 to 127) can be divided into multiple quantization sub-ranges. Quantization sub-ranges 610a, 610b, 610c, and 610d can be the largest based on their low densities. On the other hand, quantization sub-ranges 610e, 610f, 610g, 610h, 610i, and 610j (between −65 to −30) as well as quantization sub-ranges 610k, 610l, 610m, 610n, 610o, and 610p (between 30 to 65) are the smallest due to their high densities. In some examples, the quantization sub-ranges can be arranged such that the integral area of graph 620 within each quantization sub-range is substantially equal. Each quantization sub-range is associated with one of compressed/quantized weights q0 to q15. For the process of quantization, an uncompressed weight falling within a quantization sub-range can be represented by the compressed/quantized weight associated with the quantization sub-range. For example, an uncompressed weight falling within the range −127 to −65 can be represented by q0, whereas an uncompressed weight falling within the range 65 to 127 can be represented by q15. On the other hand, for the process of de-quantization, lookup table 604 can store a mapping between each of the compressed/quantized weights q0 to q15 and a value representing a mid-point of the quantization sub-range associated with each compressed/quantized weight. For example, q0 can be mapped to a mid-point between −127 and −65, whereas q15 mapped to a mid-point between 65 and 127.

Figure 7:
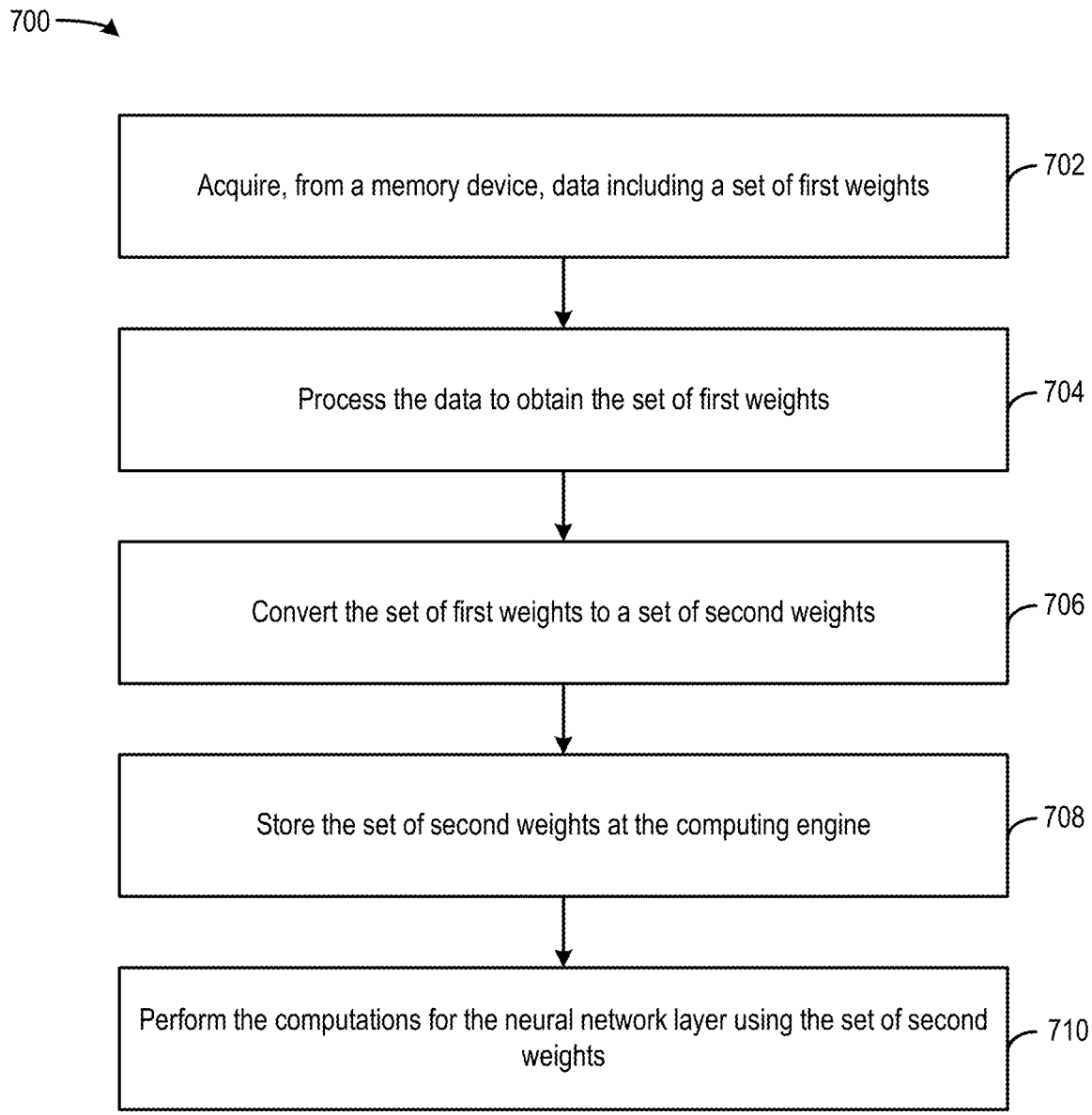
FIG. 7 illustrates an example flow diagram of performing neural network computations, according to certain aspects of the present disclosure.

FIG. 7 illustrates an example flow diagram of a process 700 for performing computations of a neural network layer. Process 700 may be implemented by, for example, neural network processor 402 to support neural network computations. The computations may include, for example, computations for a deep neural network (DNN), a convolutional neural network (CNN), etc.

At operation 702, weights expansion engine 430 may receive, from a memory device (e.g., state buffer 422, memory 412, etc.) data including a set of first weights. The first weights can be compressed weights.

At operation 704, weights expansion engine 430 may process the data to obtain the set of first weights. In some examples, weights expansion engine 430 may receive configuration information indicating a size of each of the first weights. Weights expansion engine 430 may process the data by performing bit-shifting operations based on the size information. For example, if each of the first weights has a size of two bits, weights expansion engine 430 can perform bit-shifting operations to shift the data by two bits at a time. Each of the set of first weights can be obtained after each bit-shifting operation.

At operation 706, weights expansion engine 430 may convert the set of first weights to a set of second weights. The set of second weights can be an expanded/de-quantized form of the set of compressed weights and each can have a larger size than each of the set of first weights. The conversion can be based on accessing lookup table 604 that maps the sets of first weights to the sets of second weights. The mapping can be based on a non-linear quantization process and can be based on a density distribution of the second weights, as discussed above. At operation 708, weights expansion engine 430 may fetch the set of second weights to computing engine 424, which can store the set of second weights and use the set of second weights to perform the neural network computations at operation 710.

Figure 8:
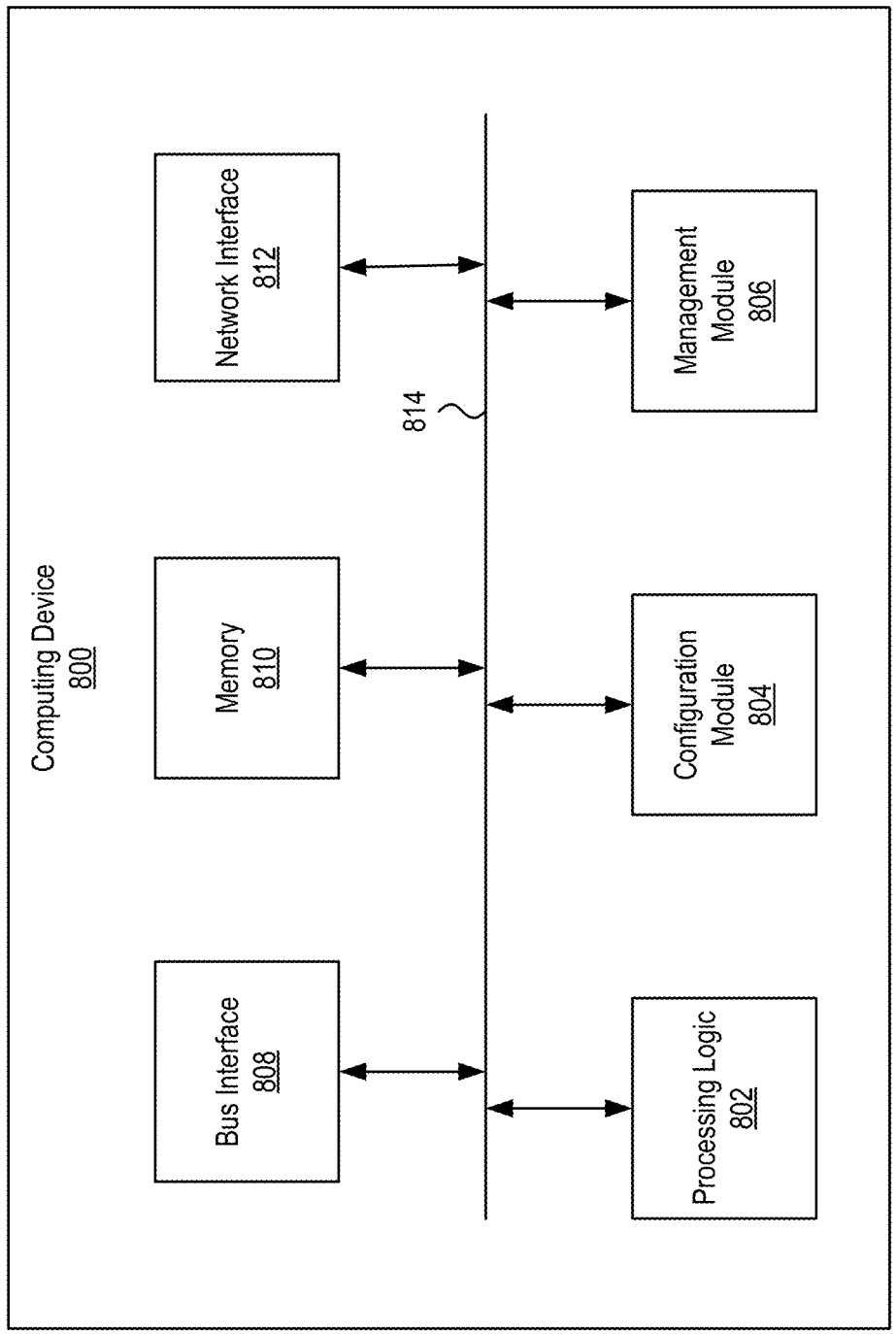
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with provision of an image recognition service) can be allocated to a client upon request.

In one example, the computing device 800 may include processing logic 802, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810. Processing logic 802 may also include hardware circuities for performing artificial neural network computation including, for example, Neural network processor 802, etc.

The access to processing logic 802 can be granted to a client to provide the personal assistant service requested by the client. For example, computing device 800 may host a virtual machine, on which an image recognition software application can be executed. The image recognition software application, upon execution, may access processing logic 802 to predict, for example, an object included in an image. As another example, access to processing logic 802 can also be granted as part of bare-metal instance, in which an image recognition software application executing on a client device (e.g., a remote computer, a smart phone, etc.) can directly access processing logic 802 to perform the recognition of an image.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory 810 may also store, for example, software applications for performing artificial neural network computation. For example, memory 810 may store software routines related to the computations of equations above. In a case where processing logic 802 is in the form of FPGA, memory 810 may store netlists data representing various logic circuit components of processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 812.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit for performing neural network computations, the integrated circuit being coupled with a memory device configured to store compressed weights and comprising:
   a computing engine configured to perform computations for a neural network layer; and
   a weight expansion engine coupled with the computing engine and configured to:
      perform a first read operation at the memory device to obtain first read data including a first set of compressed weights;
      receive configuration information indicating that each of the first set of compressed weights has a first number of bits;
      determine, based on the first number, the first set of compressed weights from the first read data;
      determine, using a lookup table, a first set of expanded weights based on the first set of compressed weights, each weight of the first set of expanded weights having a second number of bits, the second number exceeding the first number;
      perform a second read operation at the memory device to obtain second read data including a second set of compressed weights;
      receive the configuration information indicating that each of the second set of compressed weights has a third number of bits, the third number being different from the first number;
      determine, based on the third number, the second set of compressed weights from the first read data;
      determine, using the lookup table, a second set of expanded weights based on the second set of compressed weights, each weight of the second set of expanded weights having the second number of bits, the second number exceeding the third number; and
      provide the first set of expanded weights and the second set of expanded weights to the computing engine to enable the computing engine to perform neural network computations based on input data, the first set of expanded weights, and the second set of expanded weights.

2. The integrated circuit of claim 1, wherein the weight expansion engine further comprises:
   a bit shifting logic circuit configured to:
      determine, based on the configuration information, the first number of bits in each of the first set of compressed weights and the third number of bits in each of the second set of compressed weighs;
      generate a first set of shifted read data based on shifting the first read data by multiples of the first number of bits, each of the first set of shifted read data corresponding to each of the first set of compressed weights and having the second number of bits; and
      generate a second set of shifted read data based on shifting the second read data by multiples of the third number of bits, each of the second set of shifted read data corresponding to each of the second set of compressed weights and having the second number of bits; and
   a least significant bits (LSB) zeroing logic circuit configured to:
      generate a first set of zero-padded compressed weights, the first number of most significant bits (MSBs) of each of the first set of zero-padded compressed weights being equal to the first number of MSBs of a corresponding one of the first set of shifted read data and remaining least significant bits (LSBs) of the each of the first set of zero-padded compressed weights being set to zero; and
      generate a second set of zero-padded compressed weights, the third number of MSBs of each of the second set of zero-padded compressed weights being equal to the third number of MSBs of a corresponding one of the second set of shifted read data and remaining least significant bits (LSBs) of the each of the second set of zero-padded compressed weights being set to zero;
   and wherein the lookup table is configured to map the first set of zero-padded compressed weights to the first set of expanded weights and to map the second set of zero-padded compressed weights to the second set of expanded weights.

3. The integrated circuit of claim 1, wherein:
   the first set of compressed weights comprises a first compressed weight and a second compressed weight;
   the first compressed weight is mapped to a first range of the first set of expanded weights;
   the second compressed weight is mapped to a second range of the first set of expanded weights; and
   the first range is smaller than the second range.

4. The integrated circuit of claim 3, wherein:
   the first range of the first set of expanded weights is associated with a first probability of a first expanded weight within the first range being used for the neural network computations;
   the second range of the first set of expanded weights is associated with a second probability of a second expanded weight within the second range being used for the neural network computations;
   wherein mapping of the first compressed weight to the first range and the mapping of the second compressed weight to the second range are set based on, respectively, the first probability and the second probability.

5. The integrated circuit of claim 1, wherein the first set of expanded weights are provided to the computing engine to enable computations of a first neural network layer; and wherein the second set of expanded weights are provided to the computing engine to enable computations of a second neural network layer.

6. An integrated circuit comprising:
   an arithmetic circuit configured to perform arithmetic operations for a neural network; and
   a weight processing circuit configured to:
      acquire data from a memory device;
      receive configuration information indicating a size of each quantized weight of a set of quantized weights, the configuration information indicating at least a first size of each of a first subset of quantized weights and a second size of each of a second subset of quantized weights, the second size different from the first size;
      extract the set of quantized weights from the data based on the size of the each quantized weight indicated by the configuration information;
      perform de-quantization processing on the set of quantized weights to generate a set of de-quantized weights; and provide the set of de-quantized weights to the arithmetic circuit to enable the arithmetic circuit to perform the arithmetic operations.

7. The integrated circuit of claim 6, wherein the set of quantized weights comprise the first subset of quantized weights and the second subset of quantized weights, each of the first subset of quantized weights having the first size and each of the second subset of quantized weights having the second size;
wherein the weight processing circuit configured to:
extract the first subset of quantized weights from the data based on the first size indicated by the configuration information;
extract the second subset of quantized weights from the data based on the second size indicated by the configuration information; and
perform de-quantization processing on the first subset of quantized weights and the second subset of quantized weights to generate the set of de-quantized weights.

8. The integrated circuit of claim 6, wherein the weight processing circuit is further configured to extract the set of quantized weights from the data sequentially by bit-shifting the data based on the size of the each weight indicated by the configuration information.

9. The integrated circuit of claim 8, wherein the weight processing circuit further comprises a first shift register and a second shift register, the first shift register and the second shift register forming a single shift register;
wherein the data comprise first data and second data obtained from consecutive addresses in the memory device;
wherein the weight processing circuit is further configured to:
store the first data in the first shift register and the second data in the second shift register;
perform, using the first shift register and the second shift register, right-shifting operations on the first data and the second data; and
obtain the set of quantized weights from the right-shifted second data from the second shift register.

10. The integrated circuit of claim 6, wherein the de-quantization processing comprises determining, using a mapping table, a de-quantized version of each weight of the set of quantized weights.

11. The integrated circuit of claim 10, wherein the set of weights is within a range of weights; and
wherein a mapping between the set of quantized weights and the set of weights is based on a distribution density of the range of weights.

12. The integrated circuit of claim 11, wherein the distribution density includes a distribution of frequencies at which each weight within the range of weights is provided to the arithmetic circuit to perform the arithmetic operations for a neural network layer of the neural network.

13. The integrated circuit of claim 12, wherein, in the mapping table:
a first quantized weight is mapped to a first sub-range of the range of weights;
a second quantized weight is mapped to a second sub-range of the range of weights;
the second sub-range is larger than the first sub-range; and
a first integral of the distribution density within the first sub-range is larger than a second integral of the distribution density within the second sub-range.

14. The integrated circuit of claim 6, wherein:
the memory device stores a first set of quantized weights and a second set of quantized weights;
each weight of the first set of quantized weights has a different size from each weight of the second set of quantized weights; and
the weight processing circuit is configured to select between acquiring the first set of quantized weights and acquiring the second set of quantized weights for the arithmetic circuit.

15. The integrated circuit of claim 14, wherein:
both of the first set of quantized weights and the second set of quantized weights are generated from quantizing a set of weights associated with a neural network layer; and
the weight processing circuit is configured to select between acquiring the first set of quantized weights and acquiring the second set of quantized weights based on a capacity of the arithmetic circuit for handling the arithmetic operations for the neural network layer.

16. The integrated circuit of claim 14, wherein:
the first set of quantized weights is generated from quantizing a first set of weights associated with a first neural network layer;
the second set of quantized weights is generated from quantizing a second set of weights associated with a second neural network layer; and
the weight processing circuit is configured to select between acquiring the first set of quantized weights and acquiring the second set of quantized weights based on whether the arithmetic circuit is to perform the arithmetic operations for the first neural network layer or for the second neural network layer.

17. The integrated circuit of claim 6, wherein the memory device is external to the integrated circuit.

18. The integrated circuit of claim 17, further comprising an internal memory device;
wherein the weight processing circuit is configured to store the set of de-quantized weights at the internal memory device; and
wherein the set of de-quantized weights are provided to the arithmetic circuit from the internal memory device.

19. An integrated circuit comprising:
a memory device;
an arithmetic circuit configured to perform arithmetic operations for a neural network layer; and
a weight processing circuit configured to:
acquire data from the memory device;
receive configuration information indicating a size of each quantized weight of a set of quantized weights, the configuration information indicating at least a first size of each of a first subset of quantized weights and a second size of each of a second subset of quantized weights, the second size different from the first size;
extract the set of quantized weights from the data based on the size of the each weight indicated by the configuration information;
perform de-quantization processing on the set of quantized weights to generate a set of de-quantized weights; and
provide the set of de-quantized weights to the arithmetic circuit to enable the arithmetic circuit to perform the arithmetic operations.

* * * * *